(12) United States Patent
Yin et al.

(10) Patent No.: US 9,996,892 B2
(45) Date of Patent: Jun. 12, 2018

(54) APPARATUS AND METHOD FOR EFFICIENT GRAPHICS PROCESSING IN A VIRTUAL EXECUTION ENVIRONMENT

(71) Applicant: INTEL CORPORATION, Santa Clara, CA (US)

(72) Inventors: Li Yin, Shanghai (CN); Jianhui Li, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 246 days.

(21) Appl. No.: 14/780,440

(22) PCT Filed: Nov. 21, 2014

(86) PCT No.: PCT/CN2014/091834
§ 371 (c)(1),
(2) Date: Sep. 25, 2015

(87) PCT Pub. No.: WO2016/078069
PCT Pub. Date: May 26, 2016

(65) Prior Publication Data
US 2016/0328817 A1    Nov. 10, 2016

(51) Int. Cl.
*G06T 15/00*    (2011.01)
*G06T 1/20*    (2006.01)
(Continued)

(52) U.S. Cl.
CPC ............ *G06T 1/20* (2013.01); *G06F 9/30145* (2013.01); *G06F 9/455* (2013.01);
(Continued)

(58) Field of Classification Search
None
See application file for complete search history.

(56) References Cited

U.S. PATENT DOCUMENTS 7,739,556 B1 *  6/2010  Duluk, Jr. ........... G06F 11/0715
                                               345/501
9,640,148 B2 *  5/2017  Brown ................. G09G 5/363
(Continued)

FOREIGN PATENT DOCUMENTS

CN    101981543 A    2/2011
CN    101981653 A    2/2011
(Continued)

OTHER PUBLICATIONS

International Preliminary Report on Patentability for Application No. PCT/CN2014/091834, dated Jun. 1, 2017, 6 pages.
(Continued)

*Primary Examiner* — Joni Richer
(74) *Attorney, Agent, or Firm* — Nicholson De Vos Webster & Elliott LLP

(57) ABSTRACT

An apparatus and method are described for improving the efficiency of graphics operations in a virtual execution environment. For example, one embodiment of a system comprises: a classification module to detect graphics application programming interface (API) calls in a guest execution environment and responsively classify the graphics API calls as originating from an application or a system component; the classification module to associate information with each of the graphics API calls to indicate whether each of the graphics API calls originated from the application or from the system component; and an enhanced graphics API translator (EGAT) to translate the graphics API calls to a format executable in a host execution environment, the EGAT to identify each of the API calls as originating from the application or the system component using the information associated with the graphics API calls by the classification module, the EGAT comprising: a first translation sequence to translate the graphics API calls to a first set of translated graphics API calls if the graphics API calls (Continued)

originated from the application; and a second translation sequence to translate the graphics API calls to a second set of translated graphics API calls if the graphics API calls originated from the system component, the first set of translated graphics API calls being different from the second set of translated graphics API calls.

17 Claims, 26 Drawing Sheets

(51) Int. Cl.
| | |
|---|---|
| *G06F 9/455* | (2018.01) |
| *G06F 9/54* | (2006.01) |
| *H04N 21/443* | (2011.01) |
| *G06F 9/30* | (2018.01) |
| *G06F 9/46* | (2006.01) |

(52) U.S. Cl.
CPC ...... *G06F 9/45533* (2013.01); *G06F 9/45545* (2013.01); *G06F 9/45558* (2013.01); *G06F 9/46* (2013.01); *G06F 9/541* (2013.01); *G06T 15/005* (2013.01); *H04N 21/4431* (2013.01)

(56) References Cited

U.S. PATENT DOCUMENTS

| | | | |
|---|---|---|---|
| 2003/0020741 A1 | 1/2003 | Boland et al. | |
| 2005/0122330 A1 | 6/2005 | Boyd et al. | |
| 2005/0179691 A1* | 8/2005 | Johnson | G06T 1/60 345/552 |
| 2007/0294665 A1* | 12/2007 | Papakipos | G06F 8/45 717/119 |
| 2009/0100257 A1* | 4/2009 | Sandmel | G06T 15/005 713/100 |
| 2011/0157196 A1* | 6/2011 | Nave | G06F 9/4445 345/522 |
| 2014/0055466 A1* | 2/2014 | Petrov | G09G 5/363 345/520 |

FOREIGN PATENT DOCUMENTS

| | | |
|---|---|---|
| CN | 104025050 A | 9/2014 |
| TW | I317874 B | 12/2009 |
| TW | I344603 B | 7/2011 |
| TW | I348625 B | 9/2011 |

OTHER PUBLICATIONS

Search report from foreign counterpart Taiwan Patent Application No. 104134392, dated Mar. 2, 2017, 1 page.

Notice of Allowance from foreign counterpart Taiwan Patent Application No. 104134392, dated Sep. 29, 2017, 3 pages.

PCT Notification of Transmittal of the International Search Report and the Written Opinion of the International Searching Authority, or the Declaration from PCT/CN2014/091834, dated Jun. 29, 2015, 12 pages.

* cited by examiner

FIG. 9A SAMPLE COMMAND FORMAT
900

| CLIENT 902 | OPCODE 904 | SUB-OPCODE 905 | DATA 906 | COMMAND SIZE 908 |

APPARATUS AND METHOD FOR EFFICIENT GRAPHICS PROCESSING IN A VIRTUAL EXECUTION ENVIRONMENT

CROSS-REFERENCE TO RELATED APPLICATION

This patent application is a U.S. National Phase Application under 35 U.S.C. § 371 of International Application No. PCT/CN2014/091834, filed Nov. 21, 2014, entitled APPARATUS AND METHOD FOR EFFICIENT GRAPHICS PROCESSING IN A VIRTUAL EXECUTION ENVIRONMENT.

BACKGROUND

Field of the Invention

This invention relates generally to the field of computer processors. More particularly, the invention relates to an apparatus and method for efficient graphics processing in a virtual execution environment.

Description of the Related Art

A virtual-machine system is a computer system that includes a virtual machine monitor (VMM) supporting one or more virtual machines (VMs). A Virtual Machine Monitor (VMM) is a software program that controls physical computer hardware and presents programs executing within a Virtual Machine (VM) with the illusion that they are executing on real physical computer hardware. Each VM typically functions as a self-contained platform, controlled by a "guest" operating system (OS), i.e., an OS hosted by the VMM, which executes as if it were running on a real machine instead of within a VM.

In some implementations, the virtual execution environment (e.g., the VMM) is provided by a "host" operating system (OS) which is natively executed on the computing hardware. The host OS may support multiple different guest OSs, each potentially running multiple different applications. In this implementation, non-native instructions executed by the applications are intercepted, decoded and translated to native instructions by logic within the host OS. The results of the native instructions are then provided back to the applications from the host OS. In addition to non-native general purpose instructions, non-native graphics instructions may also be intercepted, decoded and translated into native graphics instructions for execution on a graphics processing unit (GPU).

In mobile market segments, there are usually multiple co-existing platforms, and an application which runs on one platform cannot run on another platform. It would be of significant value if a single platform (e.g., an Intel Architecture (IA)-based platform) could be configured to run any application regardless of its original target platform. Platform virtualization such as discussed above is one possible solution to realize this vision. To run mobile applications well on a virtual platform, however, efficient graphics API translation is critical to achieving close to native user experience.

BRIEF DESCRIPTION OF THE DRAWINGS

A better understanding of the present invention can be obtained from the following detailed description in conjunction with the following drawings, in which:

FIG. 9A is a block diagram illustrating a graphics processor command format according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

Figure 1:
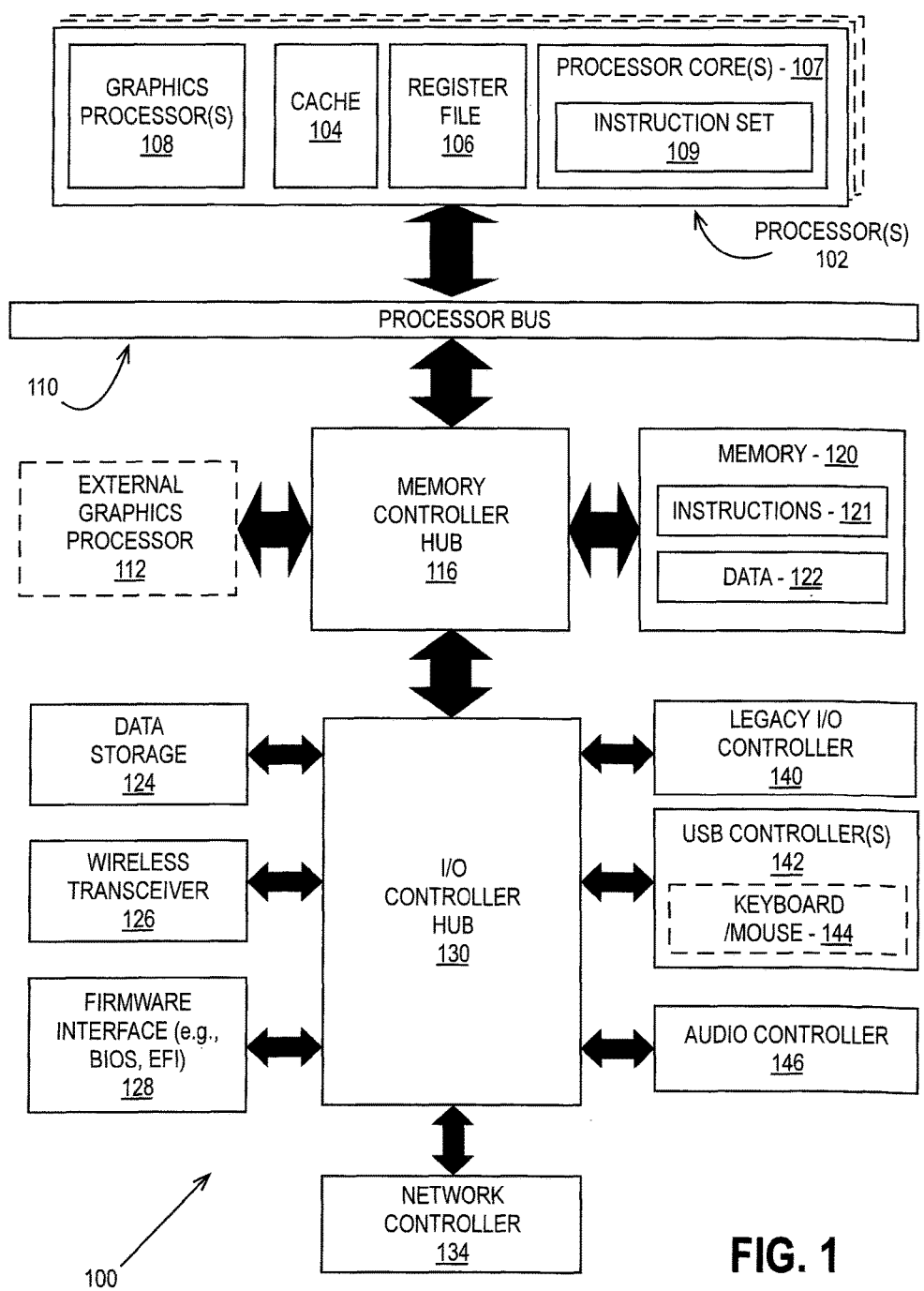
FIG. 1 is a block diagram of an embodiment of a computer system with a processor having one or more processor cores and graphics processors.
Figure 2:
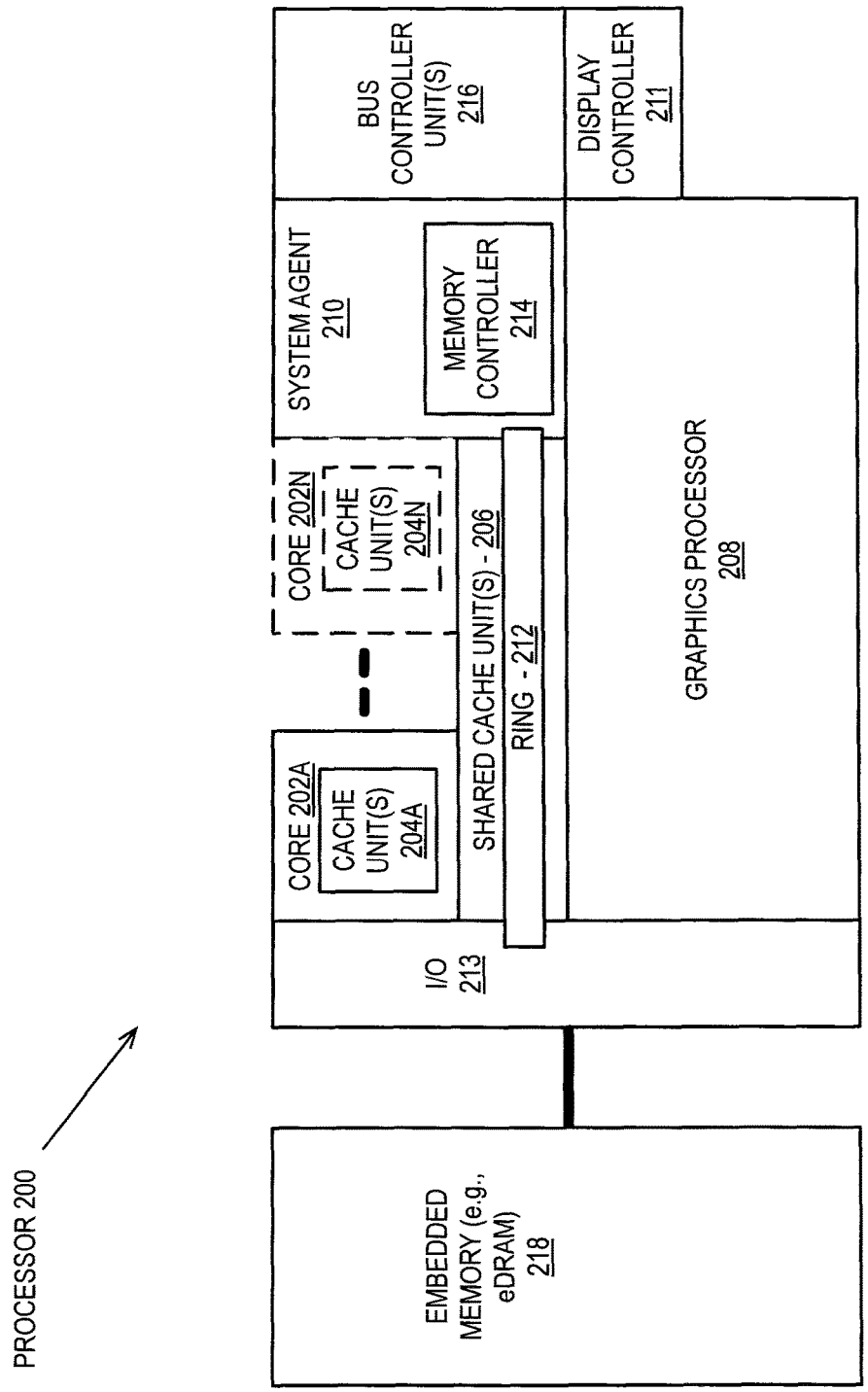
FIG. 2 is a block diagram of one embodiment of a processor having one or more processor cores, an integrated memory controller, and an integrated graphics processor.
Figure 3:
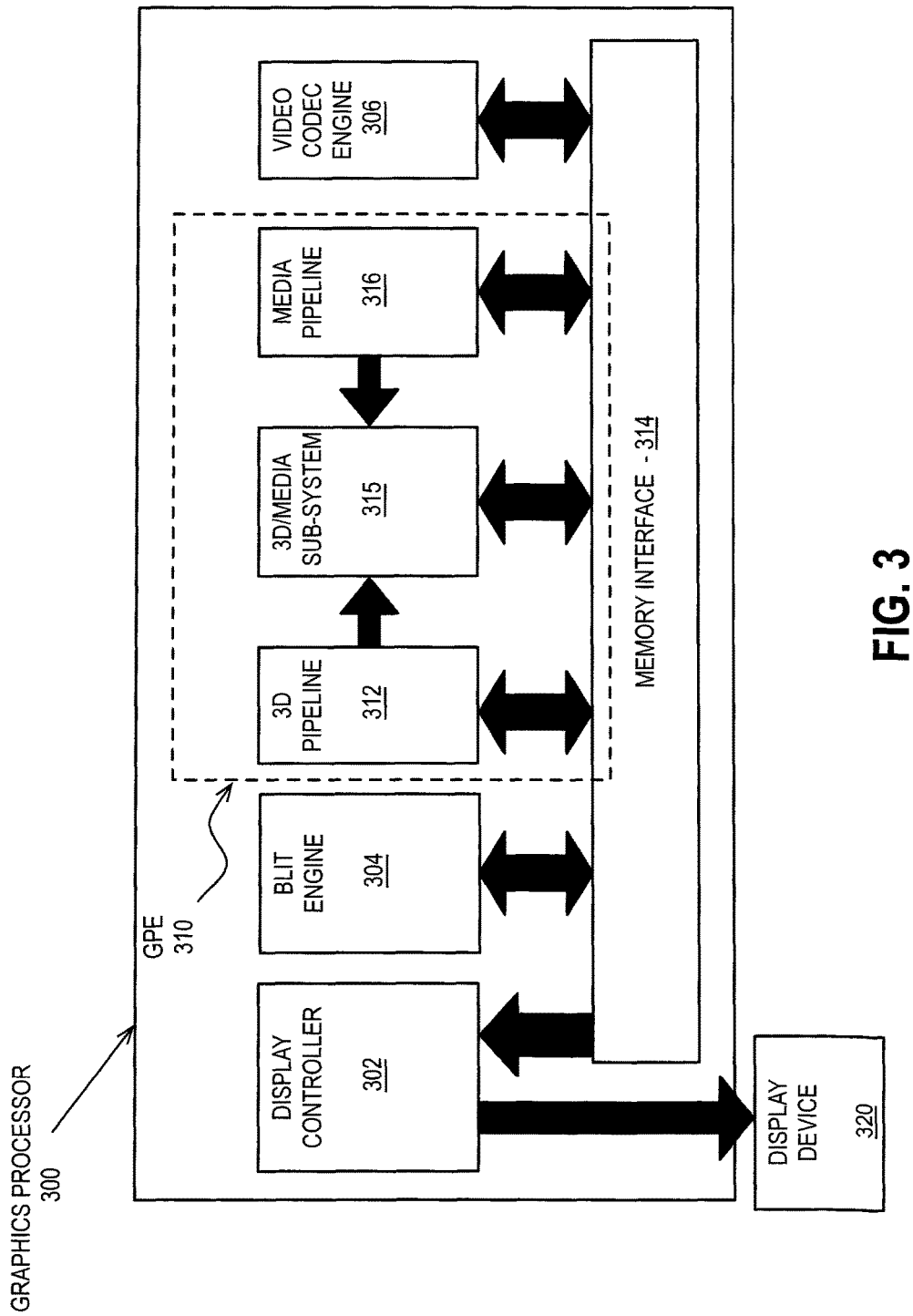
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processor 108 in the processor 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
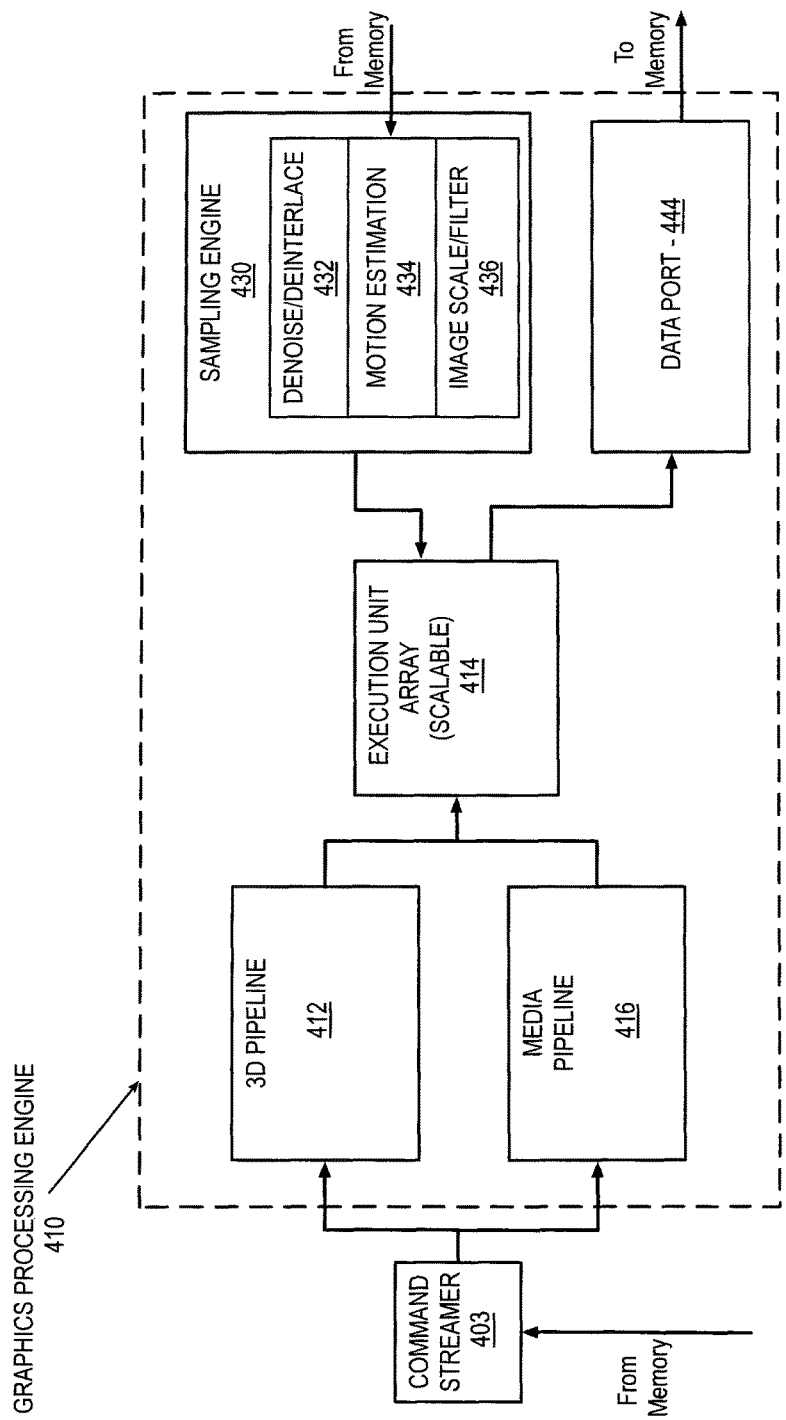
FIG. 4 is a block diagram of an embodiment of a graphics-processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
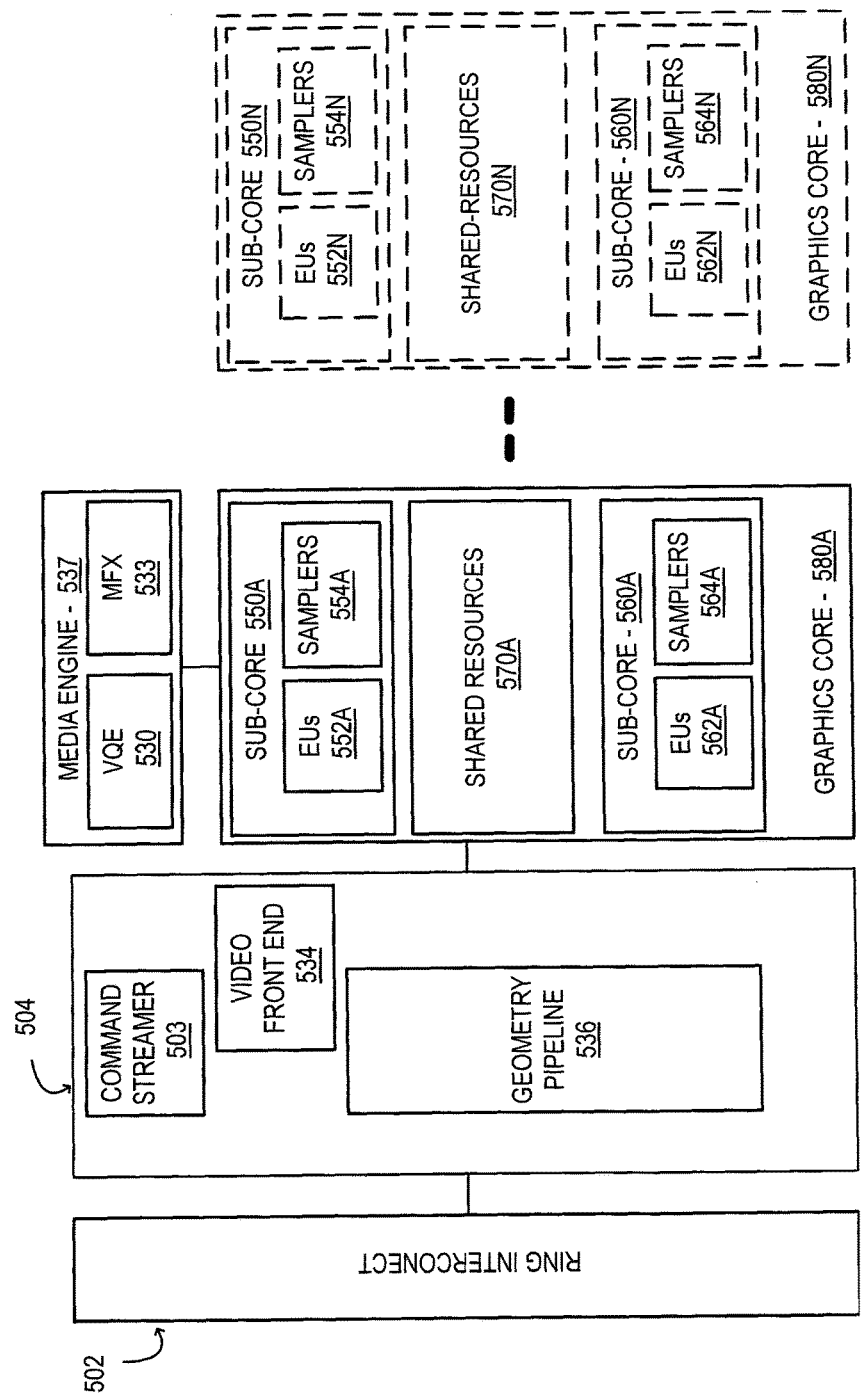
FIG. 5 is a block diagram of another embodiment of a graphics processor.
Figure 6:
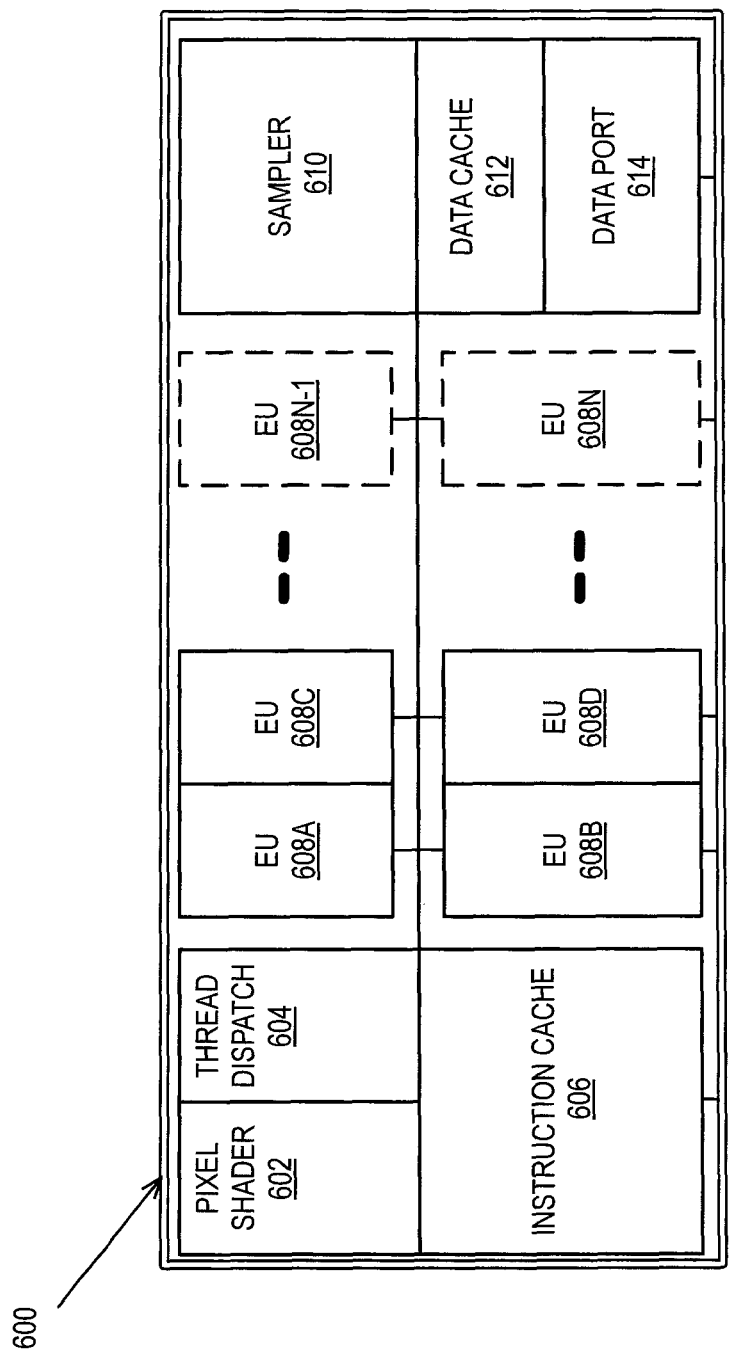
FIG. 6 is a block diagram of thread execution logic including an array of processing elements.
Figure 7:
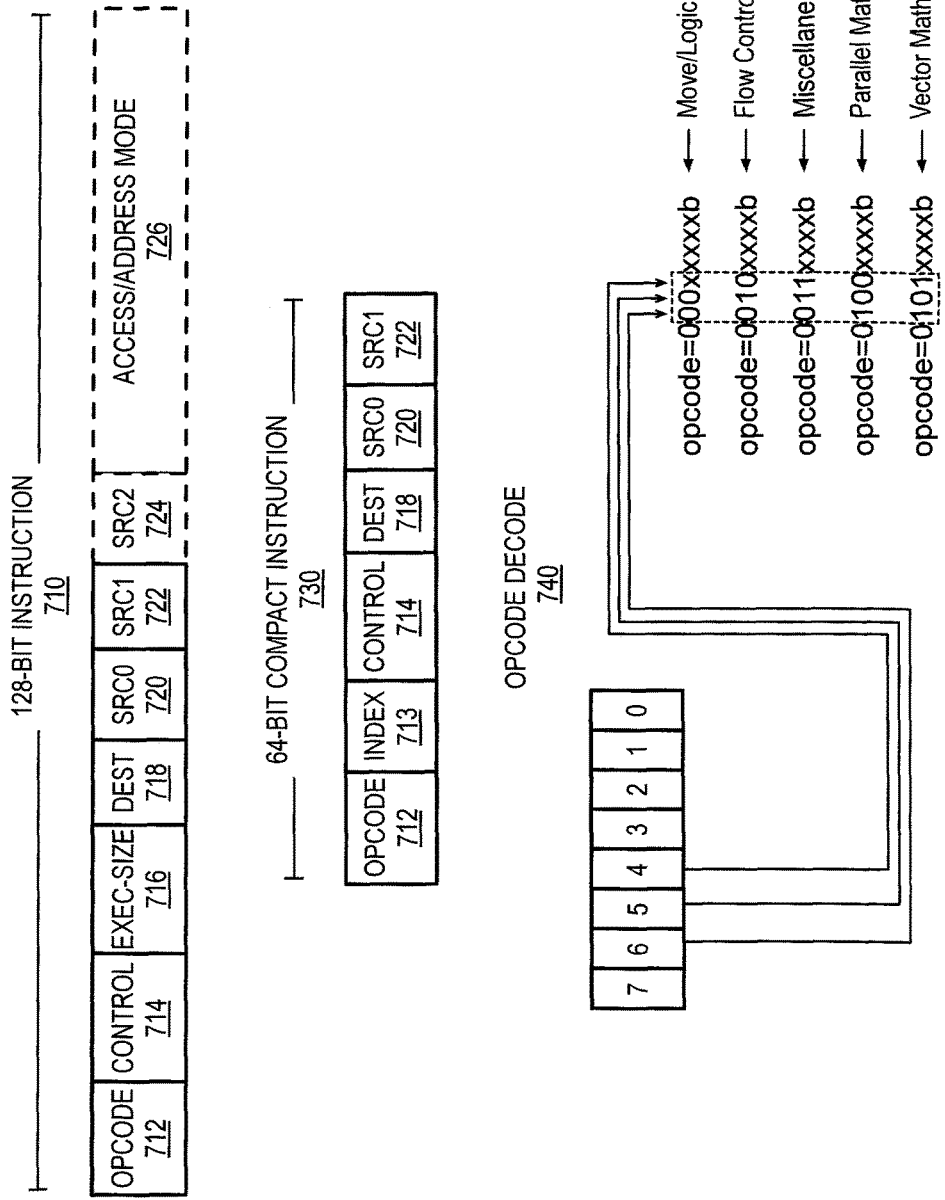
FIG. 7 illustrates a graphics processor execution unit instruction format according to an embodiment.

Execution Units—FIGS. 5-7

FIG. 5 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
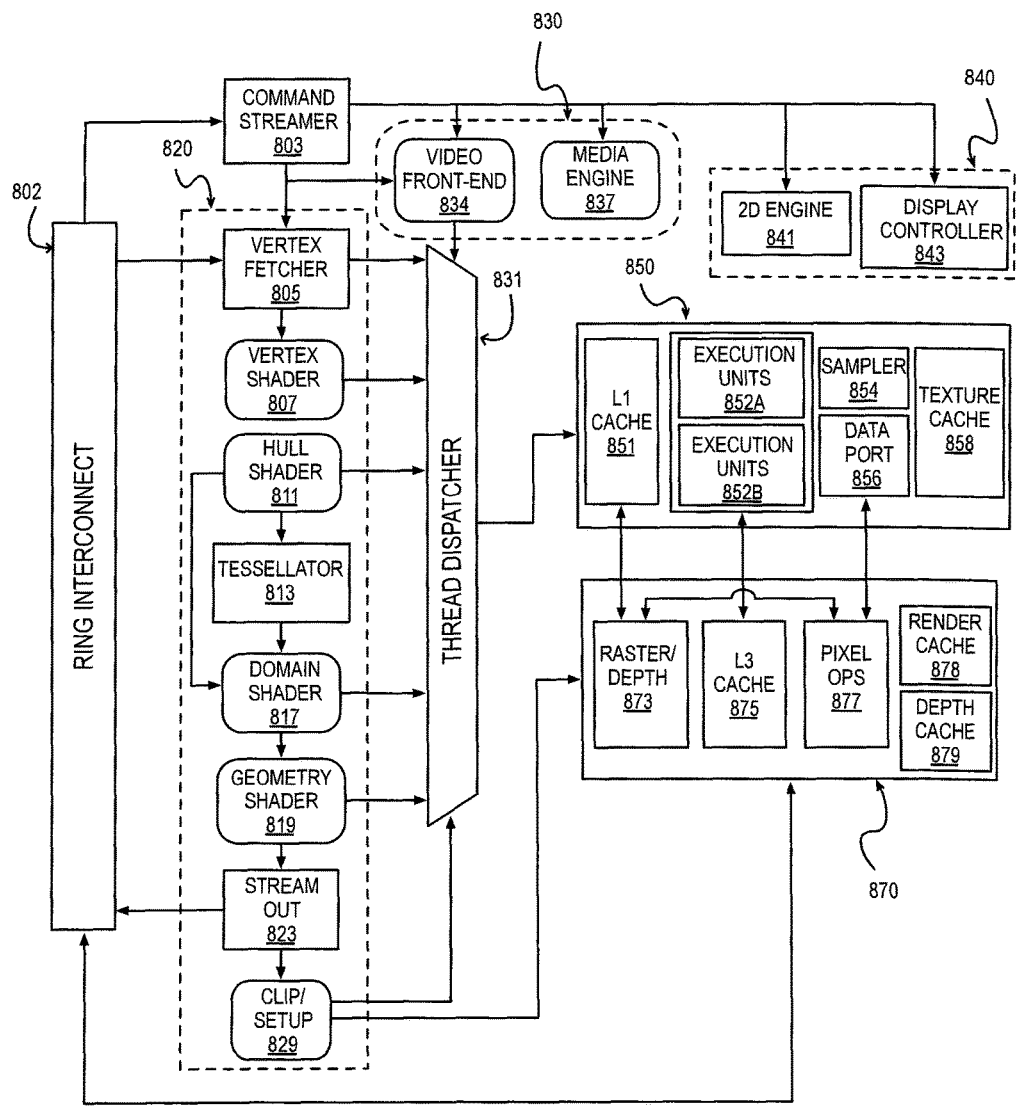
FIG. 8 is a block diagram of another embodiment of a graphics processor which includes a graphics pipeline, a media pipeline, a display engine, thread execution logic, and a render output pipeline.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9B:
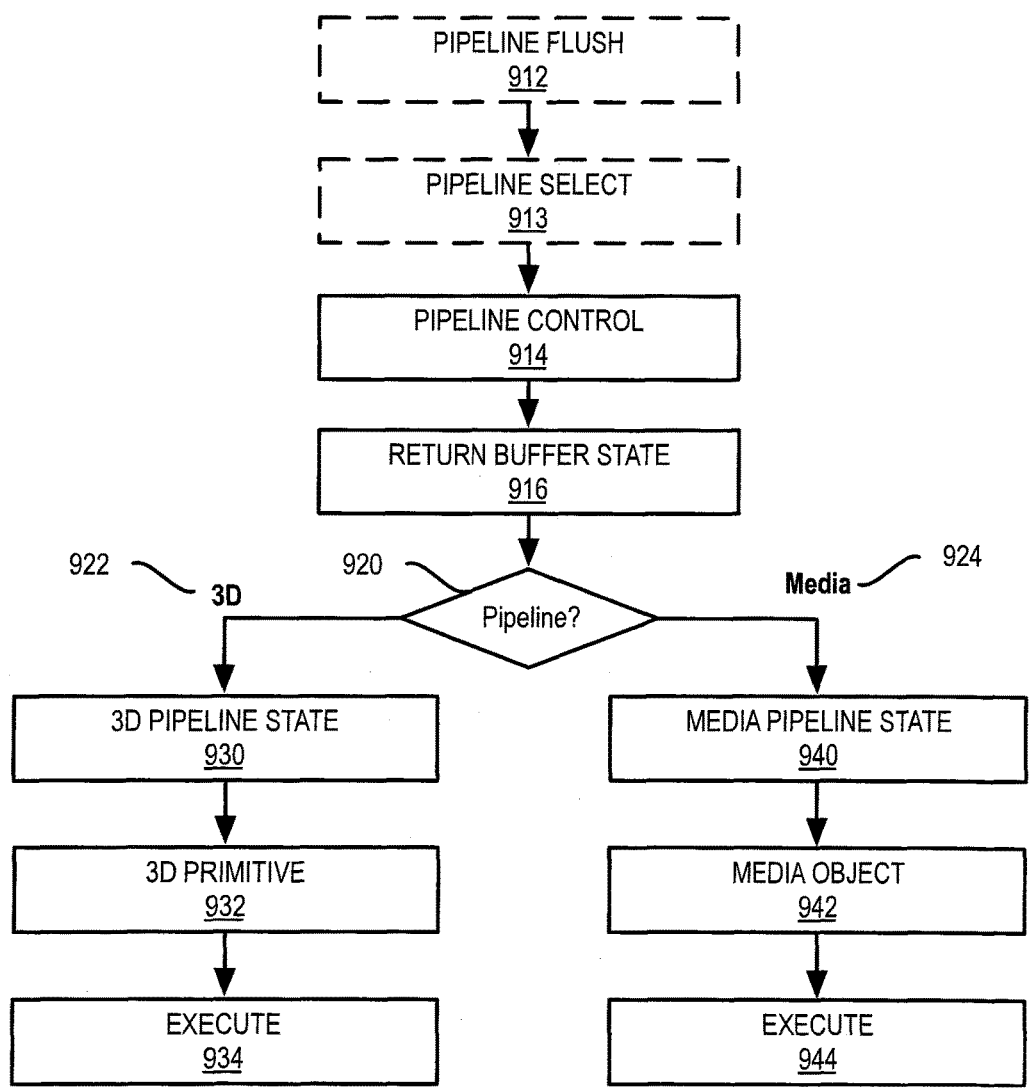
FIG. 9B is a block diagram illustrating a graphics processor command sequence according to an embodiment.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
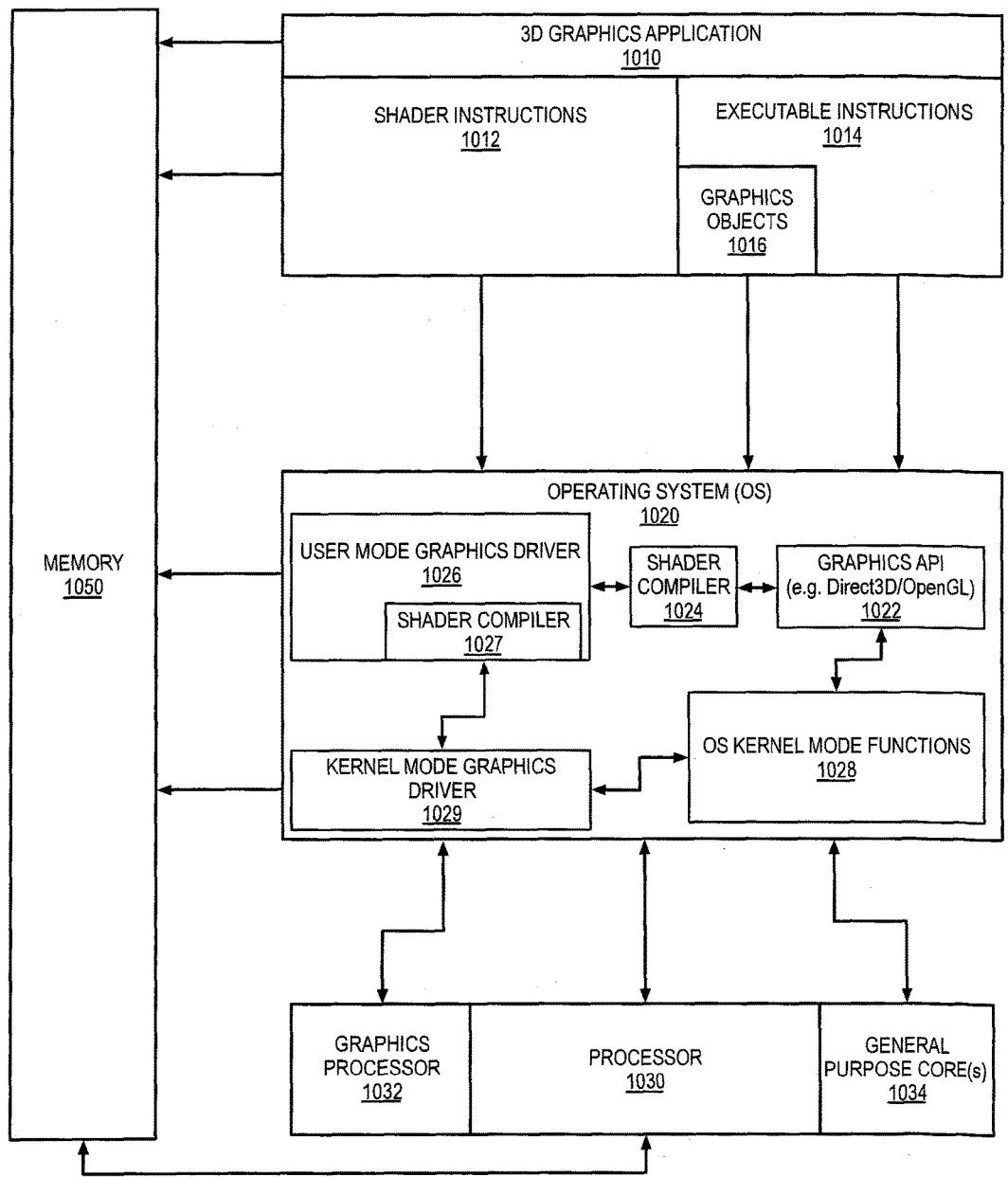
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Apparatus and Method for Efficient Graphics Processing in a Virtual Execution Environment The embodiments of the invention described below include techniques for improving the efficiency with which graphics instructions are processed in a virtual execution environment. In particular, one embodiment groups graphics return API calls and speculatively executes the graphics return API groups to improve execution time. One embodiment improves the graphics performance of emulated graphics applications by differentiating between translations for regular graphics applications and system service applications (e.g., such as the "surface composer" discussed below). In addition, one embodiment of the invention translates a guest's surface to a host texture which is faster and less resource-intensive than translating the guest's surface to a host's surface (as is done in existing graphics translation systems). All of these embodiments may be combined in a single system to dramatically improve the efficiency of graphics processing in a virtual execution environment. These and various other techniques for improving graphics performance in a virtual execution environment are described in detail below.

1. Path Length Reduction Through Speculative Execution

As mentioned above, in the mobile market segment, there are usually multiple co-existing platforms, and an application that runs on one platform is not capable of running on another platform. One embodiment of the invention includes a virtual execution environment which allows an application to be executed, regardless of its original target platform.

Figure 11:
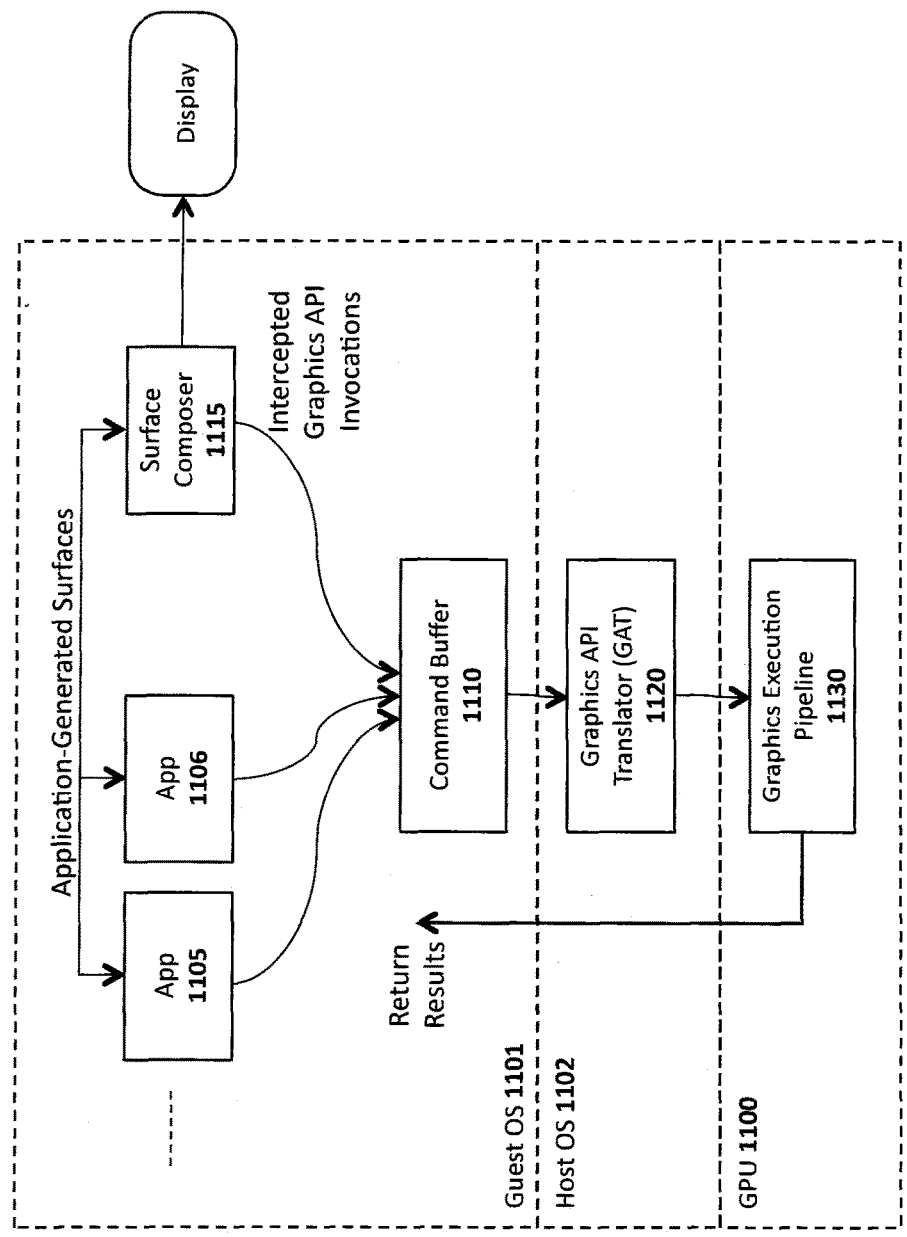
FIG. 11 illustrates an exemplary system architecture including a host operating system (OS) and a guest OS.

FIG. 11 illustrates one embodiment of an architecture on which embodiments of the invention may be implemented to efficiently execute one or more graphics applications 1105-1106 in a guest OS 1101 within a virtual execution environment provided by a host OS 1102. In the illustrated embodiment, each graphics application 1105-1106 may invoke a graphics application programming interface (API) to build a 3D model within a context and render to a surface using a chosen display configuration. When the rendering is complete, the pixel buffer associated with the surface is swapped to system service, referred to herein as the surface composer 1115, which composes surfaces from the multiple applications and then renders the final composed surface on a display.

As illustrated, in a virtual platform, the guest applications' graphics API invocations are intercepted and encoded to a command buffer 1110 in the guest OS 1101. The command buffer 1110 is then sent to the host OS for decoding and translation by the graphics API translator (GAT) 1120 (which in one embodiment, is the enhanced GAT 1620 described below). The result of the decode/translation process is a set of native graphics instructions which are executed by the graphics execution pipeline 1130 of the graphics processing unit (GPU) 1100. This process of translating between guest and host instructions consumes significant time and processor resources.

In order to reduce the transition cost between the guest OS 1101 and host OS 1102, the command buffer 1110 may only send commands to the host OS 1102 when the buffer is full or when an API call requests a return value. The API call requesting a return value is referred to herein as a "return API" call and all other API calls are referred to as "non-return API" calls.

The embodiments of the invention described below reduce the average path length in return API emulation. In particular, in one embodiment, return API calls are grouped together and all return API calls in a group are speculatively executed when the first return API call is invoked form the guest OS 1101. The speculatively executed results of the other API calls in the group may then be returned to the guest OS 1101 and cached together with the results of the first return API call. Subsequently, when the guest OS 1101 invokes another API in the group, the cached results stored in the guest side may be used directly, without any transition being required between the guest OS 1101 and the host OS 1102. The speculative execution works very well for graphics applications since the graphics commands between frames are generally very close. The return API calls are most likely repeated themselves with exactly same parameters in the rendering process of the next frame.

Figure 12:
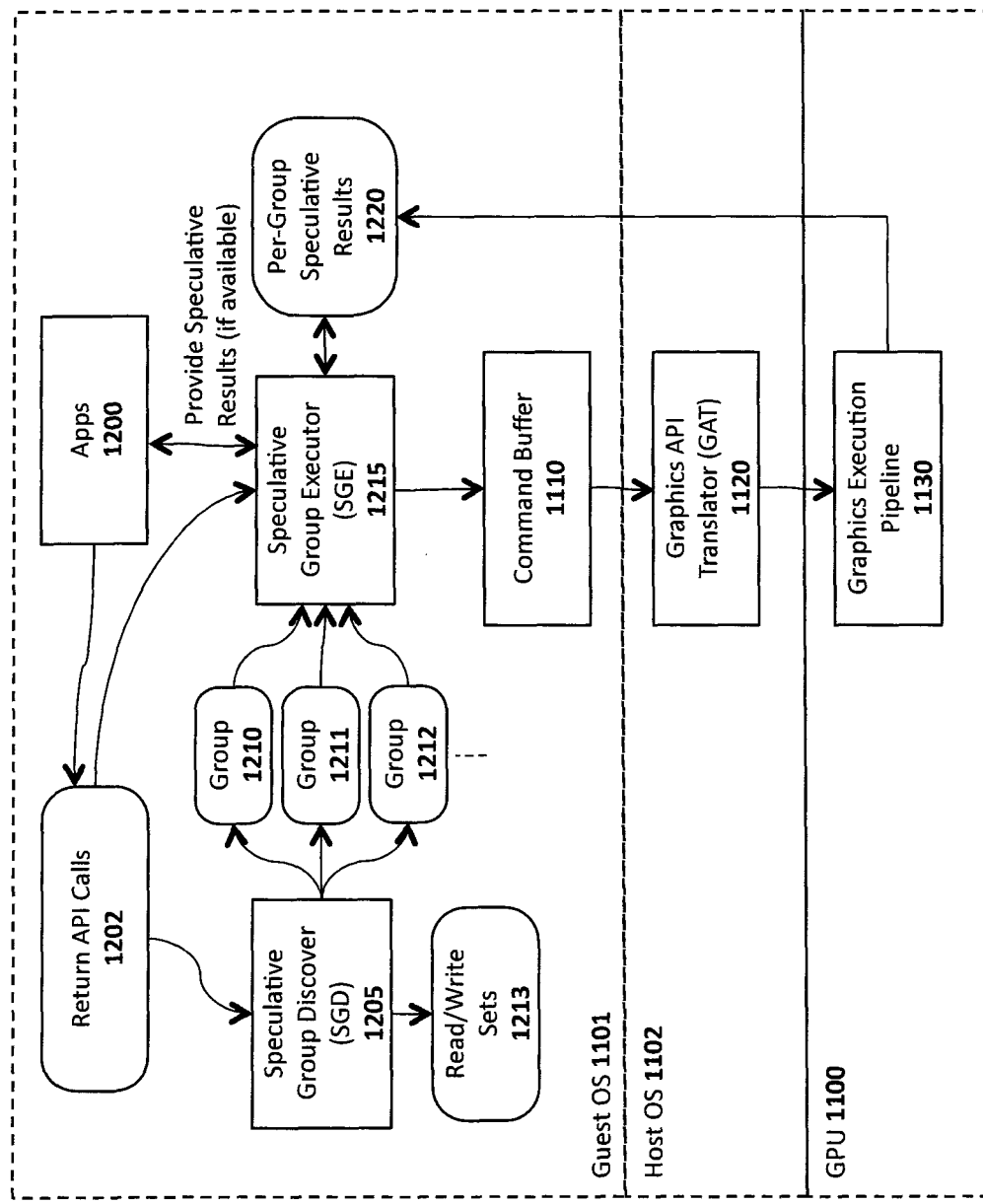
FIG. 12 illustrates one embodiment of the invention including a speculative group discovery logic and speculative group execution logic.

One embodiment illustrated in FIG. 12 includes two components executed within the guest OS 1101 for grouping API calls and speculatively executing the grouped API calls: a speculative group discover (SGD) module 1205 and a speculative group executor (SGE) module 1215. In one embodiment, SGD 1205 is activated when the guest OS sends a return API call 1202 to the host OS 1102. In one embodiment, each return API is identified by its name, parameter values, and return address (i.e., call site). In one embodiment, the SDG 1205 creates and manages groups 1210-1212 of return APIs which are to be speculatively executed together by the GPU 1100. In response to each return API, the SGD 1205 may first check to determine whether a return API group 1210-1212 associated with this return API has already been established. If not, it creates a new return API group 1210-1212 and adds the current return API as the first group element. It may then monitor each API call the guest OS 1101 sends to the host OS 1102. In one embodiment, for each return API call detected, the SGD 1205 determines whether it can be executed speculatively before all prior API calls. If so, then the return API call is added to the group with its name and parameter values. In one embodiment, the SGD 1205 stops growing a group when it cannot further include return API calls in the group (e.g., due to dependencies). In one embodiment, the API sequence being monitored is recorded together with the group.

In one embodiment, to determine whether an API call can be executed speculatively before another one, SGD 1205 analyzes how the API call reads or writes the GPU 1100 state (i.e., analyzes the dependencies associated with the API call) and stores the results as read/write sets 1213. Although illustrated as a separate entity in FIG. 12, the read/write sets 1213 may be stored within or otherwise associated with the various API groups 1210-1212. In one embodiment, for each API call, it may be statically determined which GPU states it reads ("read set") and writes ("write set"). For example, a return API often just reads the GPU 1100 state and returns the result to the application (e.g., such as configuration data, error information, etc). Non-return API calls may implicitly read and write the GPU 1100 state. In one embodiment, if the write set of one API call interferes with the read set or write set of another API call, then these two API calls cannot be re-ordered. As the SGD 1205 monitors the API sequence, it also accumulates the read set and write set 1213 of all API calls. In one embodiment, for the last return API call without a write GPU state, if its read set doesn't intersect the accumulated write set, then the return API can be rescheduled before prior API calls. If the last return API call does write the GPU state, then the SGD 1205 also needs to check whether its write set intersects with the accumulated read set and the accumulated write set. A specific example using read/write sets 1213 is described below with respect to FIG. 14.

In one embodiment, the speculative group executor (SGE) module 1215 is also activated when the guest OS 1101 sends a return API call 1202 to the host OS 1102. The SGE 1215 may check whether the return API call (and parameter values) matches a first API of any existing return API group 1210-1212. If so, it fetches all the return API calls in the group 1210-1212, encodes them to the command buffer 1110, and sends them to the host OS 1102 side. It then receives the per-group speculative results 1220 of the multiple speculatively-executed return APIs from the group. In one embodiment, after the speculative results are cached at the guest OS 1101 level, the SGE 1215 monitors each new API call and matches it against the return API group for which the speculative results 1220 were provided. In one embodiment, the order of the API call needs to be exactly matched. For non-return API calls, their names may be matched and for return API calls, their names and parameter values may be matched. When the SGE 1215 encounter a return API call, if its prior API calls are all matched, then SGE 1215 uses the speculative result 1220 cached on the guest OS 1101, thereby conserving processing resources (i.e., without involving the graphics API translator (GAT) 1120 in the host OS 1102).

In one embodiment, if a return API group 1210-1212 has low match rate (e.g., a rate below a specified threshold), it may be marked so that SGE 1215 can avoid speculative execution of return API calls in the group in the future.

Figure 13A:
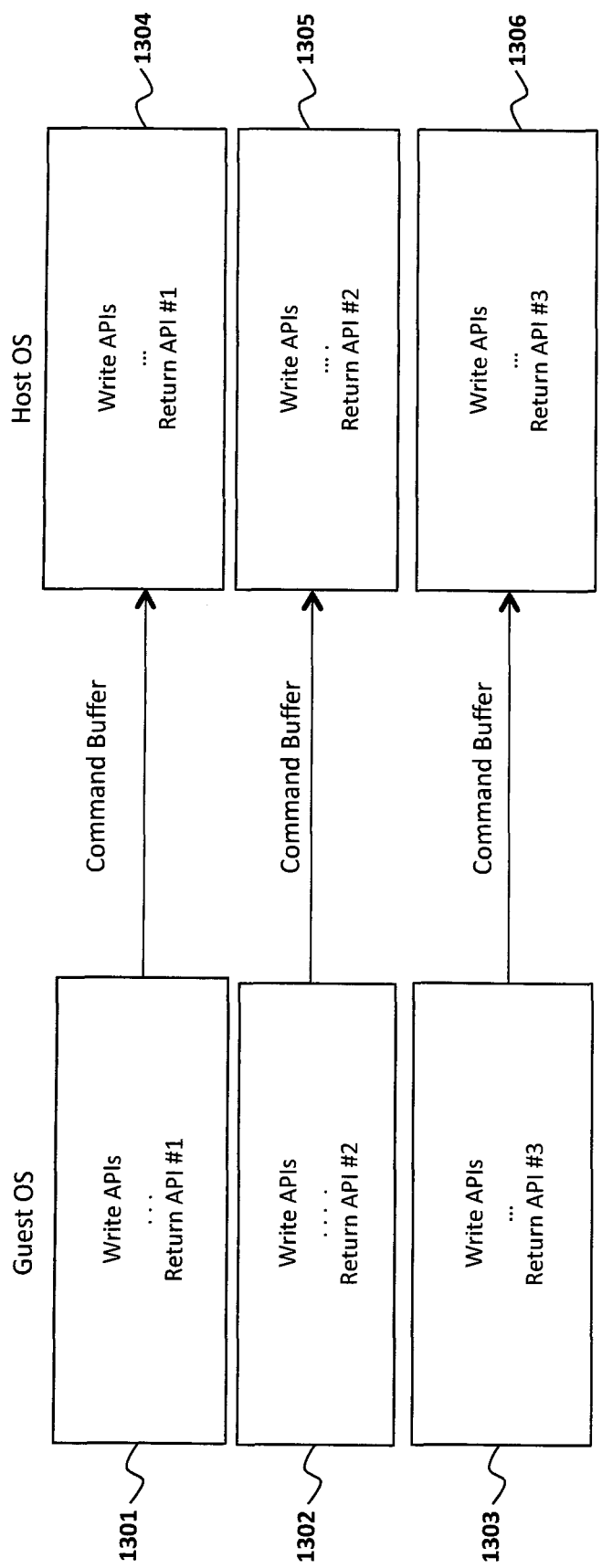
FIG. 13A illustrates a mechanism for processing return API calls generated from a guest OS.

FIG. 13A illustrates a prior implementation of a series of API calls 1301-1303 which include write API and return API calls. In the prior implementations, each of the write API calls and return API calls 1301-1303 are provided from the guest OS to the host OS via the command buffer. The host OS executes each API call in turn at 1304-1306, respectively, and provides results for the return API calls back to the guest OS.

Figure 13B:
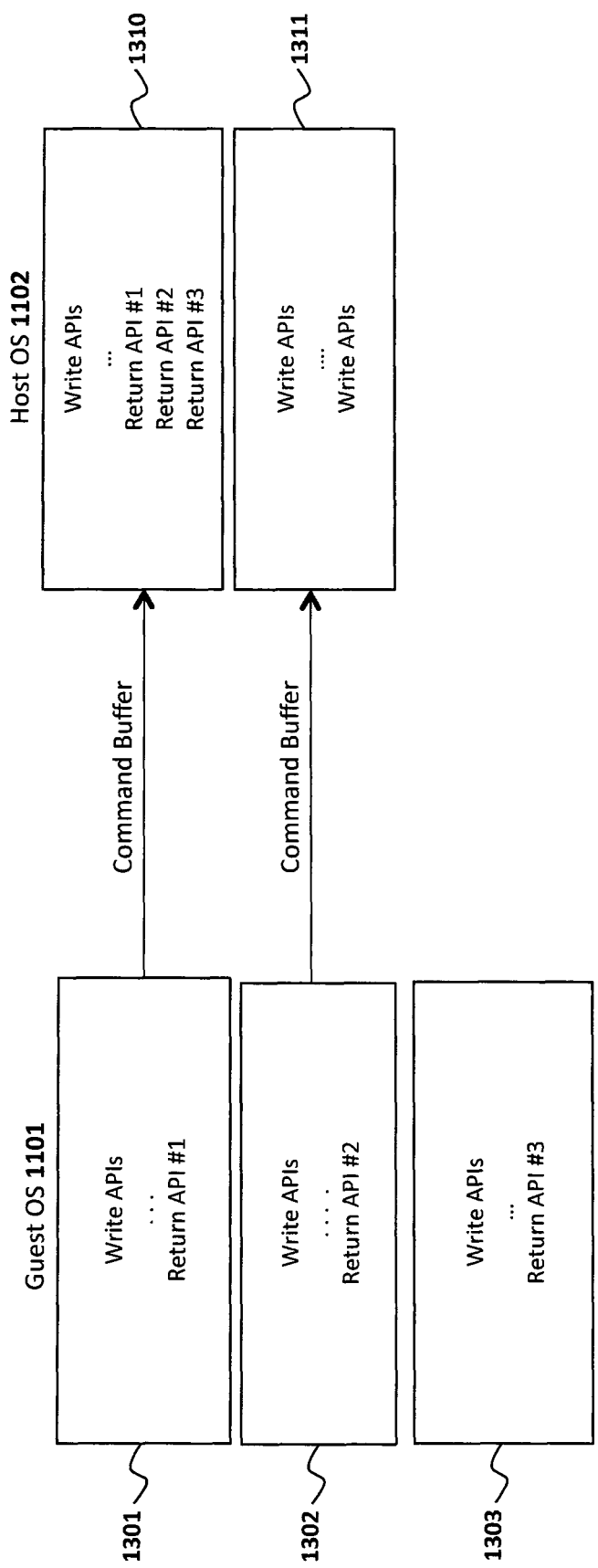
FIG. 13B illustrates one embodiment of the invention in which return API calls are grouped for speculative execution.

In contrast, in FIG. 13B, one embodiment of the invention speculatively executes return APIs #2 and #3 with return API #1 in execution block 1310. As mentioned above, the results of the return APIs #2 and #3 may be cached in the guest OS 1101 and subsequently used when needed. The write API portions of execution blocks 1302-1303 are executed by the host OS 1102 in execution block 1311. Thus, only two guest-host transitions are required.

Thus, return API calls are grouped together and speculatively executed when the first return API is invoked. The results of the rest of the API calls in the group are returned to the guest OS together with the first API call. When guest OS invokes later API calls, the result is ready in the guest side, and no transition between guest and host are required.

Figure 14:
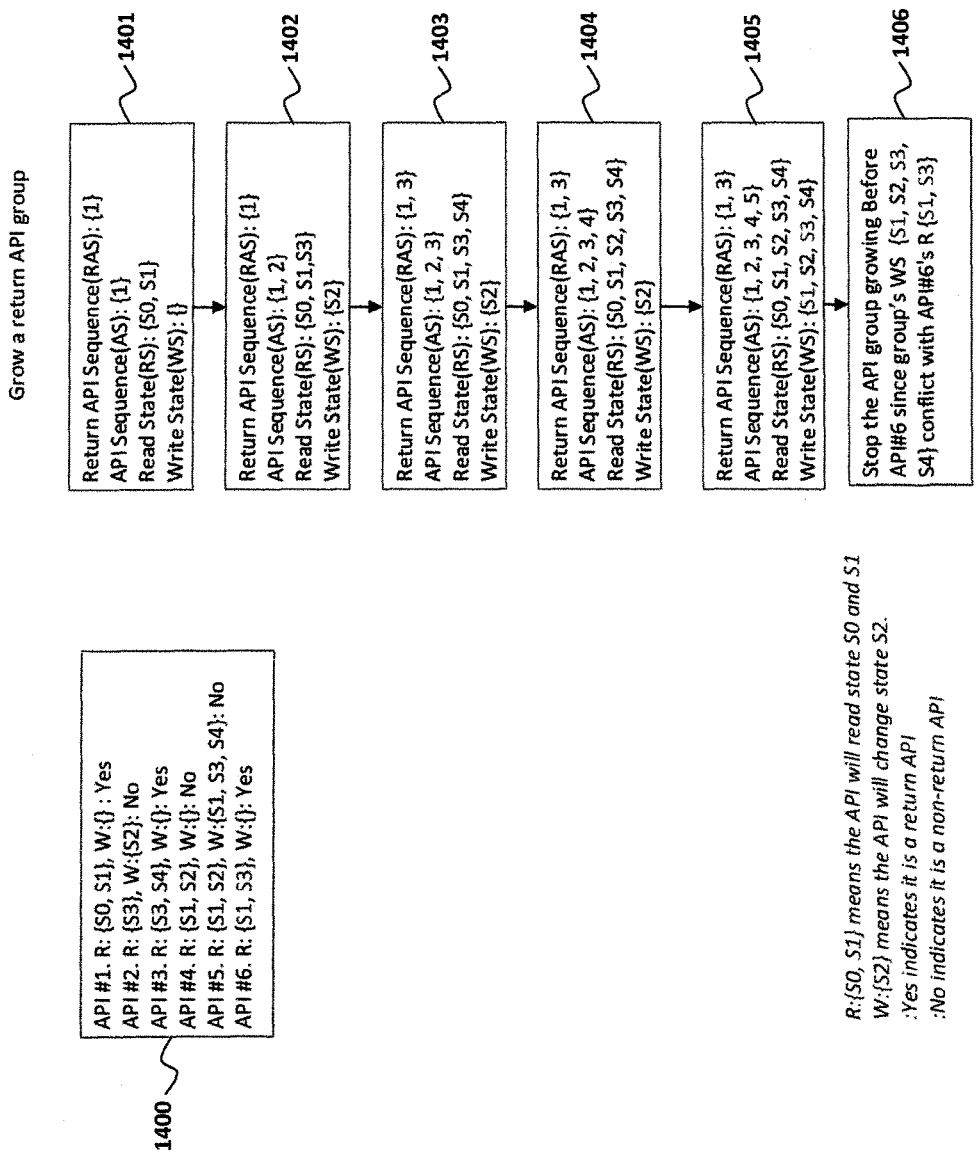
FIG. 14 illustrates one embodiment of the invention for generating a return API group.

FIG. 14 provides an example showing how API groups may be employed in accordance with one embodiment of the invention. In this example, there are 6 API calls in total (APIs #1-6), and there are 3 return APIs among them: API #1, API #3, and API #6. The illustrated embodiment tracks the read state (R) and the write state (W) for the API sequence 1400 and inhibits growth of the return API group before API #6. The Return API Sequence (RAS) represents the API return group, API Sequence (AS) identifies the APIs being monitored, read state (RS) represents the accumulated read state, and write state (WS) represents the accumulated write state.

Turning to the specific sequence in FIG. 14, at 1401, the return API sequence (RAS) group is first populated with API #1 which is the first return API and includes read operations to states S0 and S1. An API sequence group (AS) is also updated with API #1.

At 1402, API call #2 is recorded, which is not a return API. As such, the API sequence group (AS) is updated with API #2 but not the RAS group. Because it has a read operation to state S3, the tracked read state (RS) is updated to include states S0, S1 (from API #1), and S3 (from API #2). In addition, a write to state S2 is recorded.

At 1403, API call #3 is recorded. Because it is a return API it is included with API #1 in both the RAS group {1, 3} and in AS group {1, 2, 3}. Because it includes reads to states S3 and S4, the tracked read state (RS) is updated to {S0, S1, S3, S4}.

At 1404, API call #4 is recorded and is included in AS group {1, 2, 3, 4}. It is not a return API and includes reads to states S1 and S2. As such, tracked read state (RS) is updated to {S0, S1, S2, S3, S4}.

At 1405 API call #5 is recorded which is not a return API and includes reads to states S1 and S2 and writes to states S1, S3, and S4. Thus, the tracked write state (WS) is updated to {S1, S2, S3, S4}. The AS group is updated to {1, 2, 3, 4, 5}.

Finally, at 1406, API call #6 is recorded which is a return API. However, because it reads states S1 and S3, this conflicts with the AS group's combined write state (WS) which indicates writes to states S1 and S3. Consequently, the API sequence group (RAS) is prevented from growing to include API call #6.

One embodiment of the program code used to implement the above techniques is provided below. It should be noted, however, that the underlying principles of the invention are not limited to this specific implementation:

```
void SpeculateExecute( )
{
        Initialize the Return API Group Set (RAGS) to { }.
        Initialize the current working Group RAS(cG) = { }, AS(cG) =
NULL, RS(cG) = { }, WS(cG)
={ }
        For each API Sf invoked by guest do
                  status = SGE_execute(RAGS, RVB, sf)
                  if (status != speculate_success)
                      SGD_execute(RAGS, cG, sf);
Endfor
}
status_t SGE_execute (RAGS, RVB, sf)
{
        If (IsReturnAPI(sf))
                //gid is the groupid, sid is the sequence id
                (gid, sid) = pattern_matche(sf RAGS);
                If (isValid(gid)) Then
                        // If current API is the 1st one in the return
                        API group
                        If (sid == 0) Then
                                Send the gid to host and execute all
                                the APIs in RAS;
                                Get the return value from host and save them
                                into buffer (RVB);
                        Endif
                        Get the return value for Sf from the group
                        RVB;
                        Return speculate_success;
                    EndIf
                EndIf
        Execute Sf in normal path;
        Return speculate_failure;
}
void SGD_execute(RAGS, cG, Sf)
{
        If (IsReturnAPI(sf))
                if (intersect(RS(Sf), WS(cG)) == { }) &&
                (intersect(WS(Sf), RS(cG) == { }) &&
                        (intersect(WS(Sf), WS(cG)) == { })
                        RAS(cG) += {Sf};
                        AS(cG) += {Sf};
                        RS(cG) += RS(Sf);
                        WS(cG) += WS(Sf);
                Else
                        RAGS += {cG};
                        RAS(cG) = {Sf};
                        AS(cG) = {Sf};
                        RS(cG) = RS(Sf);
                        WS(cG) = WS(Sf);
                Endif
        Else
                If RAS(cG) != { } Then
                        AS(cG) += {Sf};
                        RS(cG) = RS(Sf);
                        WS(cG) = WS(Sf);
                Endif
Endif
}
```

Figure 15A:
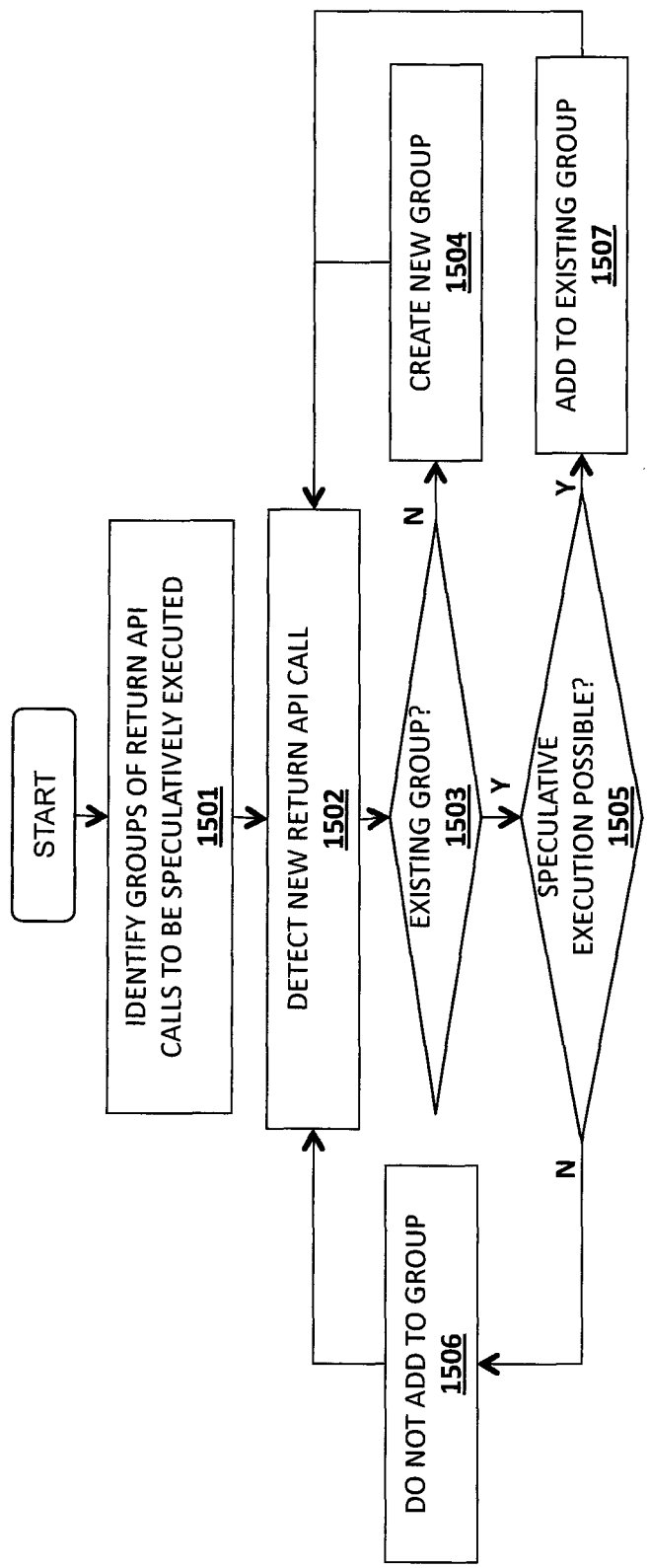
FIG. 15A illustrates a method in accordance with one embodiment of the invention for generating return API groups.

FIG. 15A illustrates one embodiment of a method for establishing and growing return API groups. The method may be implemented within the context of the system architecture described above but is not limited to any particular system architecture.

At 1501, certain groups of return API calls may (optionally) be identified ahead of time. If groups are not identified ahead of time, the process starts at 1502 where a new return API call is detected. In response, at 1503, a determination is made as to whether an existing API group is available into which the new return API call may be placed. If not, then at 1504, a new return API group is created and the current return API is added as the first group element. If an existing group exists, a determination is made at 1505 as to whether speculative execution is possible. For example, dependencies between the current API call and prior API calls may be evaluated as discussed above with respect to FIG. 14. If speculation is possible (e.g., no W/R dependences exist), then the return API call is added to the existing group at 1507. If speculative execution is not possible (e.g., due to dependencies), then at 1506, the return API call is not added to the API group. The process then continues for each new return API call.

Figure 15B:
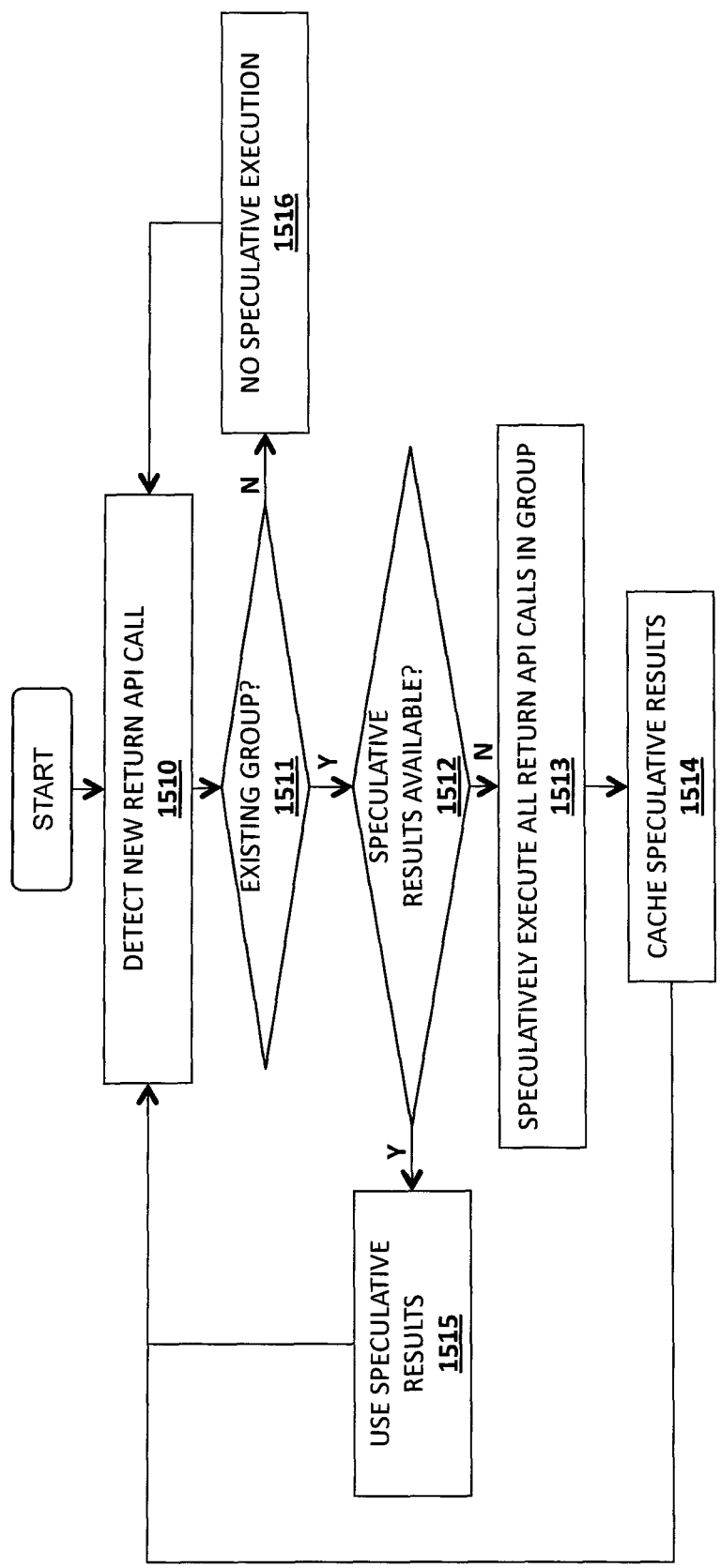
FIG. 15B illustrates a method in accordance with one embodiment of the invention for executing return API groups.

FIG. 15B illustrates one embodiment of a method for speculatively executing groups of API calls. The method may be implemented within the context of the system architecture described above but is not limited to any particular system architecture.

At 1510, a new return API call is detected and at 1511 a determination is made as to whether an existing return API group exists for the return API call. If not, then no speculative execution is performed at 1516. If so, then at 1512, a determination is made as to whether speculative results are available. For example, as described above, other return API calls in the group may have already been processed at the host OS and cached in the guest OS. If speculative results are available, then at 1515, the speculative results are used (i.e., without the need for additional emulation by the hose OS). If not, then at 1513, all return API calls in the group are speculatively executed. As mentioned, this may involve providing the return API calls to the command buffer from which they are read and translated by the host's graphics API translator (GAT). Once execution is complete, the results of all return API calls in the group may be cached in the guest OS (i.e., so that the results are available when needed without additional translation).

The above embodiments of the invention provide significant improvements over prior graphics virtualization environments. The transition between the guest and host graphics is very expensive, and reducing the transition overhead is critical to the user experience of the graphic application in a virtual platform. The above embodiments are based on observations of typical graphic return APIs usage. Graphic applications tend to issue multiple return APIs in certain stages. The return APIs typically do not change the 3D model, or the state, built by prior graphic APIs. The embodiments of the invention are designed to handle these cases significantly more efficiently than prior graphics translation systems.

In many cases, only minor changes may occur in a scene and a fairly good pattern match rate can be reached. But if a graphics scene changes significantly, the pattern match rate will surfer a dramatic decrease, and even worse, a lot of garbage return-API groups may occur. Consequently, in one embodiment of the invention, a garbage collection mechanism is used to handle this case. For instance, in one embodiment, if one return API group does not get any match within a given time period or within a given length API sequence, it is removed from the return-API group set.

2. Differentiating Translation for Different Graphics Components

To run mobile application well on a virtual platform, efficient graphics API translation is critical to achieve close to native user experience. As described above with respect to FIG. 11, the guest OS 1101 typically has multiple graphics applications 1105-1106 running simultaneously. Each graphics application 1105-1106 may use graphics APIs to build a 3D model within a context and render to a surface using a chosen display configuration. When the rendering is complete, the pixel buffer associated with the surface will be swapped to the surface composer 115 system service, which composes surfaces from multiple applications and then displays the final composed surface.

Thus, there are two types of graphic API usages on mobile platforms. Graphics applications 1105-1106 use the graphics API to produce a surface. A system component, referred to herein as the surface composer 1115, uses the graphics API to compose surfaces for multiple applications 1105-1106 and presents them to the user. In other words, the surfaces produced from regular applications 1105-1106 are not directly used for display; rather, they are an intermediate form used to create the final surface for display by the surface composer 1115, which is the ultimate consumer of surfaces produced from multiple applications.

The embodiments of the invention described below take advantage of the differences between the surface composer's usage of the graphics API and the use of the graphics API by regular graphics applications. In particular, these embodiments improve the graphics performance of the emulated graphics applications by differentiating the graphics API translation between the surface composer and regular graphics applications.

Figure 16:
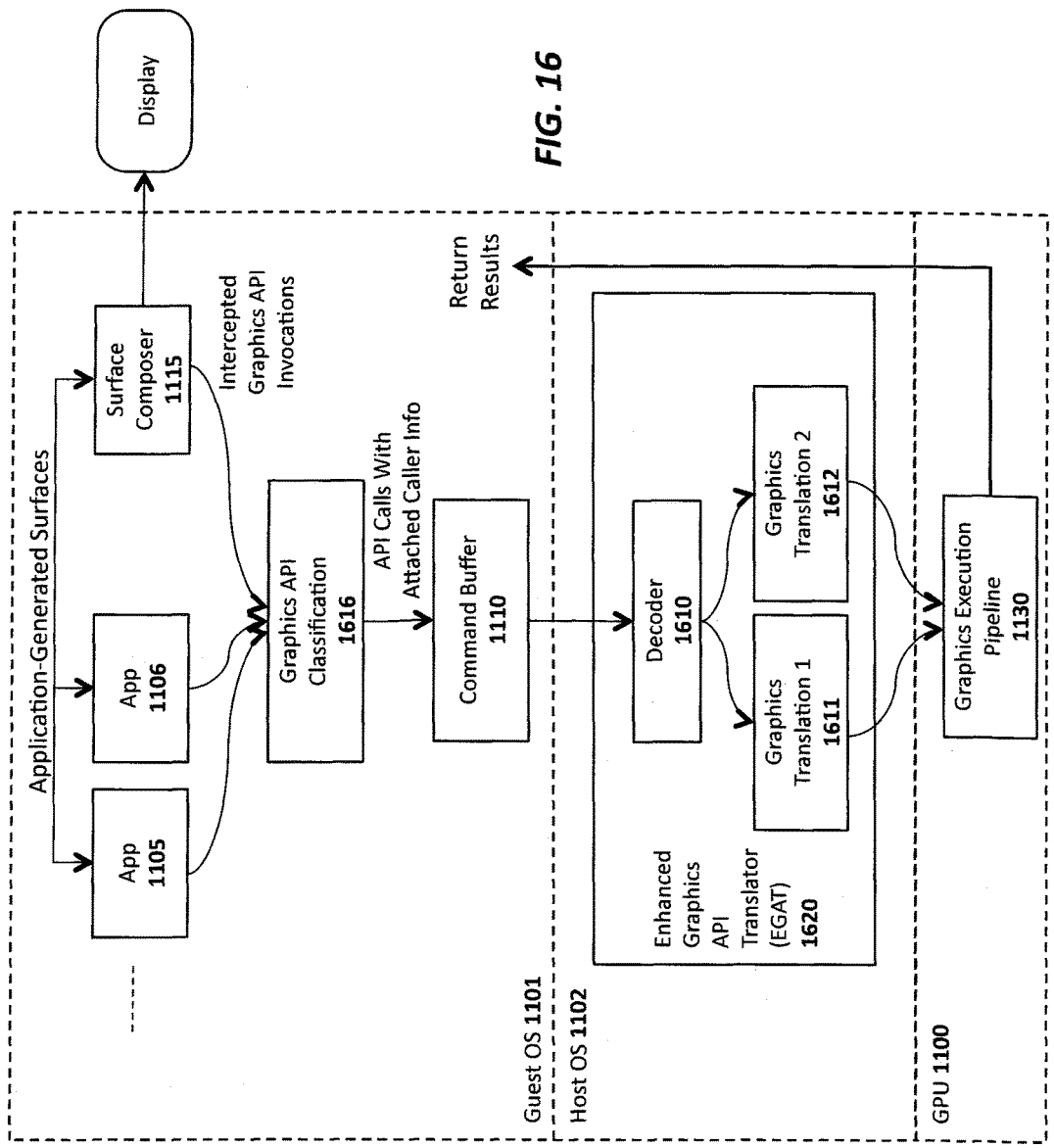
FIG. 16 illustrates one embodiment of the invention which employs differentiated graphics translation.

As illustrated in FIG. 16, one embodiment of the invention employs components on the guest OS 1101 and host OS 1102. The guest side components include a graphics API classification module 1616 which intercepts the graphics API calls and encodes the API calls to a command buffer 1110. In one embodiment, the graphics API classification module 1616 analyzes the calling environment including the calling stack or process name, determines whether the graphic API is called from a regular graphics application 1105-1106 or from the surface composer 1115, and attaches the caller information with the API call in the command buffer 1110. Various different formats may be used to identify the type of caller. For example, in the simplest case, a binary 0 may be used to identify API calls from the surface composer 1115 and a binary 1 may be used to identify API calls from graphics applications 1105-1106. In one embodiment, the source code of the surface composer may be directly modified to add this caller information (rather than collecting this information by the graphics API classification module 1616).

Once the API calls and caller information are added, the command buffer 1110 is then sent to an enhanced graphics API translator (EGAT) 1620 in the host OS 1102. In one embodiment, like the GAT 1120 discussed above (see FIGS. 11-12), the EGAT 1620 decodes the command buffer 1110 and translates the guest's graphics API calls to native graphics API calls of the host OS 1102. In this way, the guest's 3D operations are redirected to the graphics pipeline 1130 on the host GPU 1100 significantly improving the user experience. In one embodiment, a decoder 1610 of the EGAT 1620 decodes the caller information for each API call to determine whether the API call originated from the surface composer 1115 or one of the graphics applications 1105-1106. Different translation techniques may then be implemented by the EGAT 1620, depending on the originator of the API call. For example, in one particular embodiment, a first graphics translation module 1611 is used to perform translation operations for API calls originating from the applications 1105-1106 and a second graphics translation module 1612 is used to perform translation operations for API calls originating from the surface composer 1115. Thus, with this differentiation scheme, the same graphics API can be translated differently to improve performance. The details associated with different translation techniques employed in one embodiment are provided below with reference to FIGS. 17-20.

Figure 17:
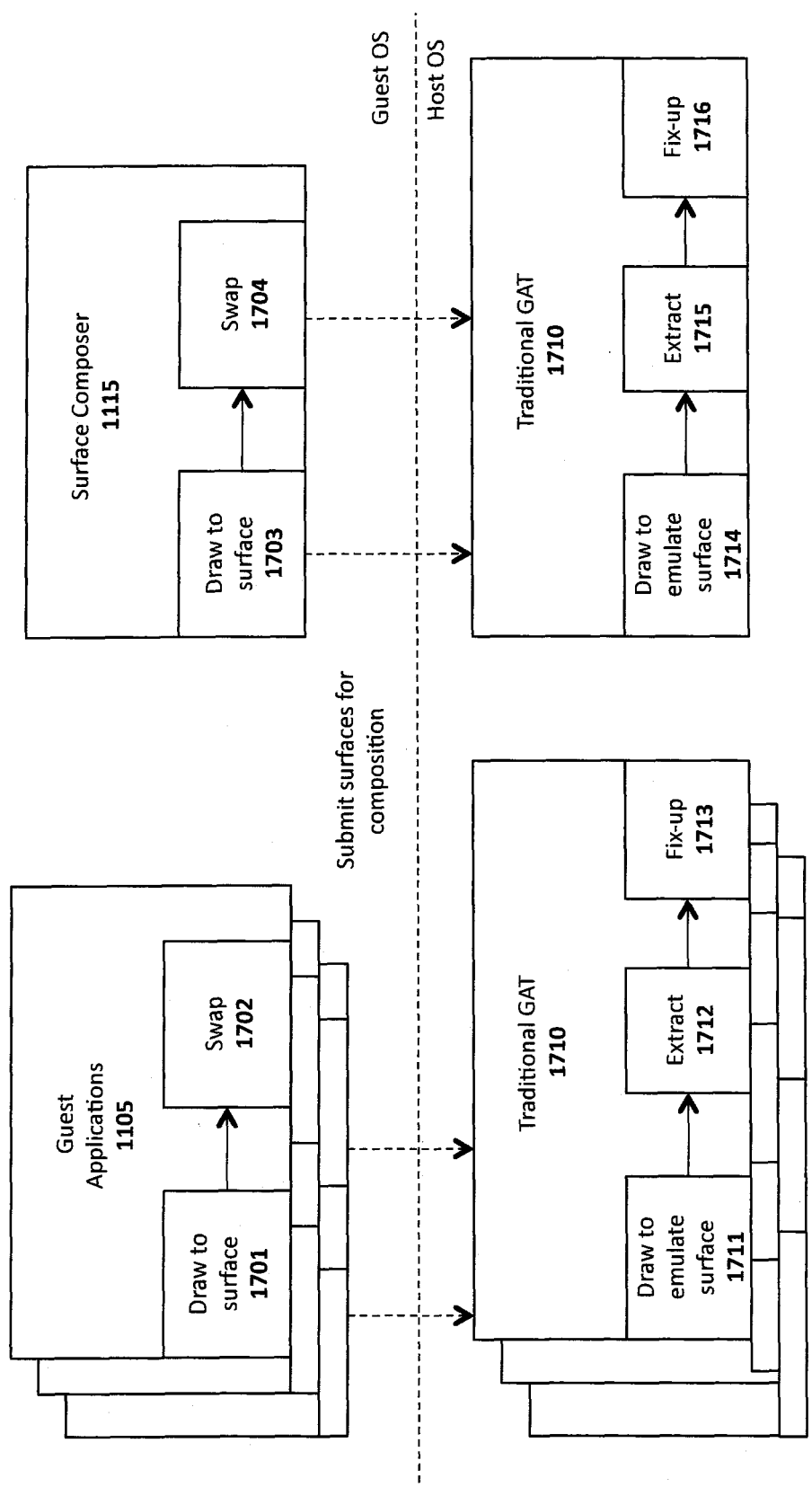
FIG. 17 illustrates a system in which surfaces are translated using a traditional graphics API translator (GAT)
Figure 18:
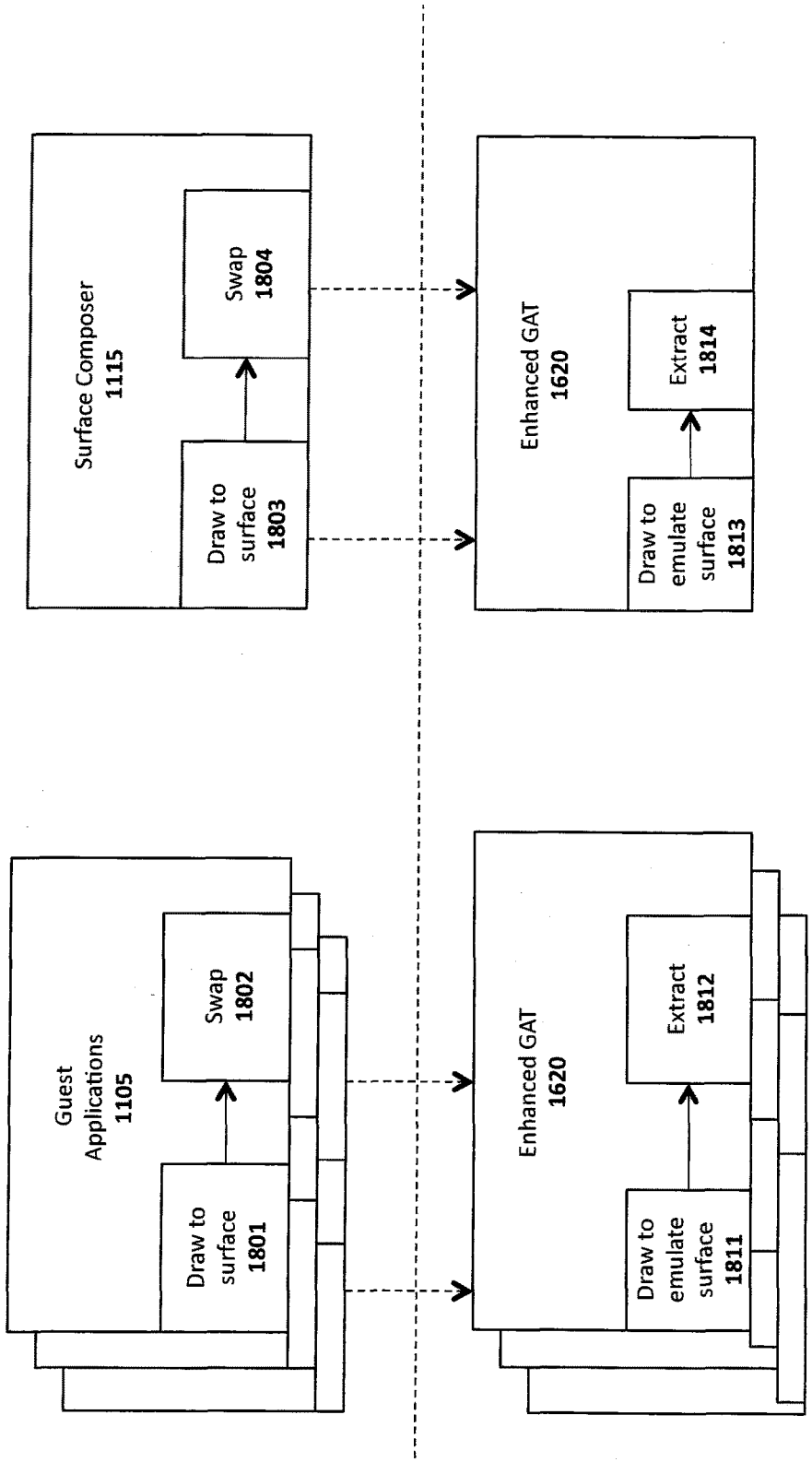
FIG. 18 illustrates one embodiment of the invention in which an enhanced GAT reduces the processing required for surface translation.

In particular, FIG. 17 illustrates techniques employed by a traditional GAT 1710 and FIG. 18 illustrates techniques employed by the EGAT 1620 in accordance with one embodiment of the invention. As illustrated in FIG. 17, the guest application 1105 uses an off-screen surface 1701 to which guest applications 1105 can render. Once completed, the graphic application 1105 swaps 1702 the recently rendered surface to the surface composer 1115. With translation, the traditional GAT 1710 draws to an emulated surface 1711 in response to changes to the off-screen surface 1701, intercepts the swap API 1702 and extracts out the underlying pixel buffer from the off-screen surface at 1712. In addition, the GAT 1710 typically performs fix-up operations 1713 on the pixel buffer. For example, it may reverse the rendered surface by 180 degrees along the y-axis, as the host rendering API assumes a reverse y-axis compared to the y-axis used by the guest application. The fix-up operation 1713 has to be done for all surfaces being composed and so is very expensive.

The traditional GAT 1710 treats the surface composer 1115 operations in the same manner. For example, once the surface composer 1115 is provided with access to the surface in response to the swap operation 1702, it performs its own operations to the surface 1703 which are emulated by the traditional GAT 1710 at 1714. It intercepts the swap operation 1704 implemented by the surface composer 1115 and extracts out the underlying pixel buffer from the off-screen surface at 1715. In addition, as with graphics applications, the GAT 1710 typically performs fix-up operations 1716 on the pixel buffer.

In one embodiment, because the enhanced GAT (EGAT) 1620 knows the pixel buffer is consumed only by the surface composer, it defers the fix-up operation until the time when the pixel buffer is consumed by the surface composer 1115. Thus, as illustrated in FIG. 18, enhanced GAT 1620 removes the fix-up operation in the swap API emulation for the guest application. With translation, the EGAT 1710 draws to an emulated surface 1811 in response to changes to the off-screen surface 1801, intercepts the swap API 1802 and extracts out the underlying pixel buffer from the off-screen surface at 1812. Similarly, for the surface composer 1115, the EGAT 1710 draws to an emulated surface 1813 in response to changes to the off-screen surface 1803, intercepts the swap API 1804 and extracts out the underlying pixel buffer from the off-screen surface at 1814. However, the EGAT does not perform fix-up operations for either the guest applications 1105 or the surface composer 1115.

The fix-up operation is removed according to the following principles. The surface composer 1115 inputs multiple surfaces and draws them to its emulate surface in a certain order. Most input surfaces require a reverse operation, but some may not require the reverse operation (in rare cases). Instead of reversing the input surfaces as a general rule, one embodiment of the invention composes them first and reverses only the output surface. The EGAT 1620 performs the fix-up operations only for those cases where the input surface does not require the reverse operation. Consequently, the EGAT ensures that the output surface is in the reverse y-axis. If all input surfaces require reverse fix-up, the EGAT 1620 composes the input surfaces and then performs only one deferred fix-up operation to reverse the output operation. Moreover, in one embodiment, the deferred fix-up operation on the output surface is combined with the surface composer's fix-up operation. Under certain situation, the combined operation may be a no-op (e.g., a combination of two reverse operations is actually a no-op).

As illustrated in FIG. 18, after the fix-up operation is removed, the next major overhead is the extract step. In one embodiment, the techniques described below for "Surface Translation with Texture Rendering" may be used to remove the extract step.

Figure 19:
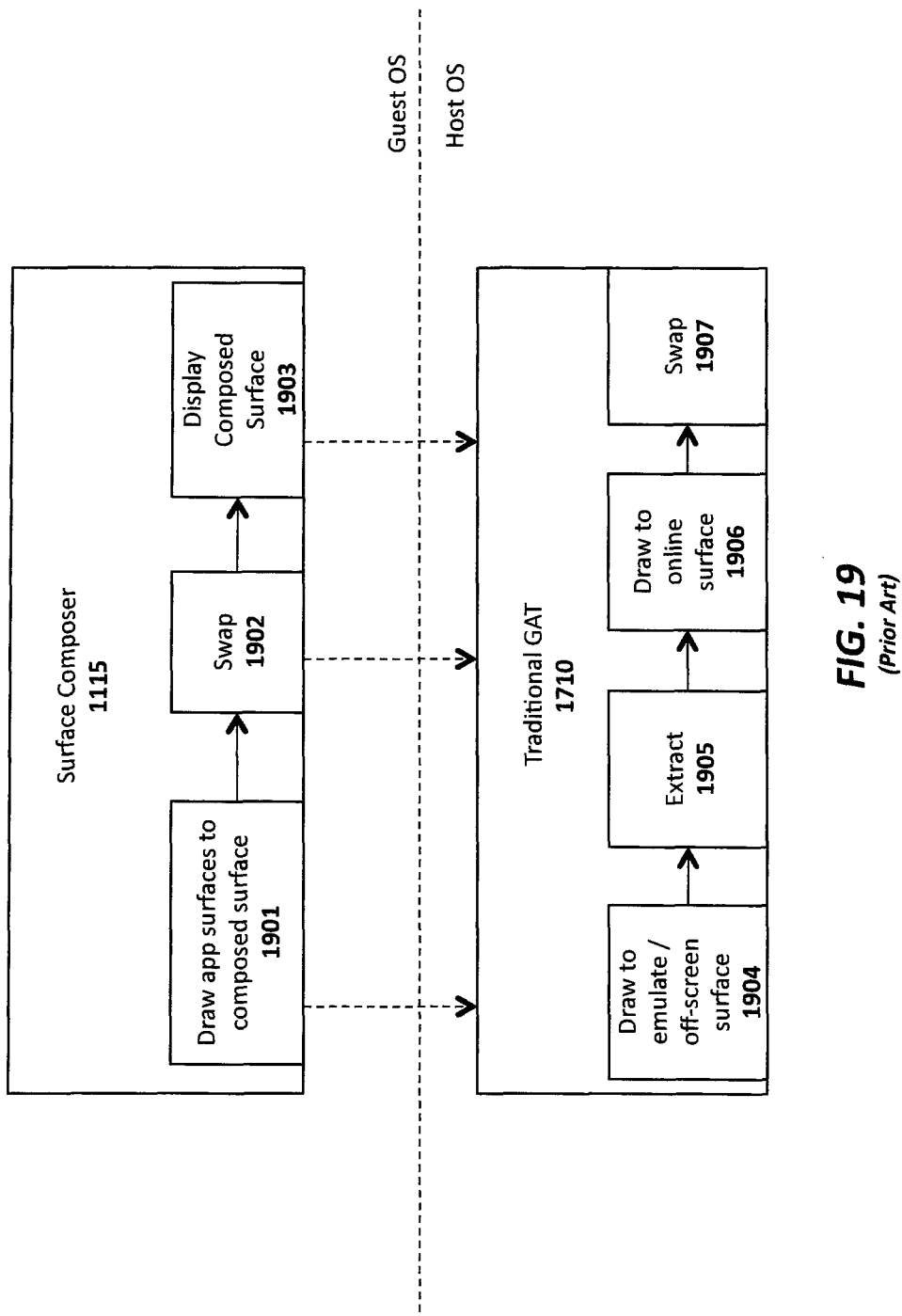
FIG. 19 illustrates a system in which the surface composer's surface is emulated in the same way as an application's surface.

The enhanced GAT can further improve the efficiency of emulating the surface composer's surface. As the surfaces produced by regular applications are used for composition, the traditional GAT 1710 emulates the guest application's surface using an off-screen surface (emulate surface) to which guest applications can render and from which the underlying pixel buffer can be extracted out for composition. Since the traditional GAT 1710 doesn't differentiate between the surfaces of regular applications and the surface of the surface composer, the surface composer's surface is emulated in the same way as illustrated in FIG. 19. Extra steps are required to extract 1905 the pixel buffer from the emulated surface 1904, and re-draw it to an online surface 1906 which is then displayed directly with the swap operation 1907. In this example, the emulated surface 1904 results from a translation of the surfaces drawn by the application 1901, the extract operation 1905 results from a translation of the swap operation 1902, and the online surface draw 1906 and swap 1907 result from a translation of the display operation 1903.

Figure 20:
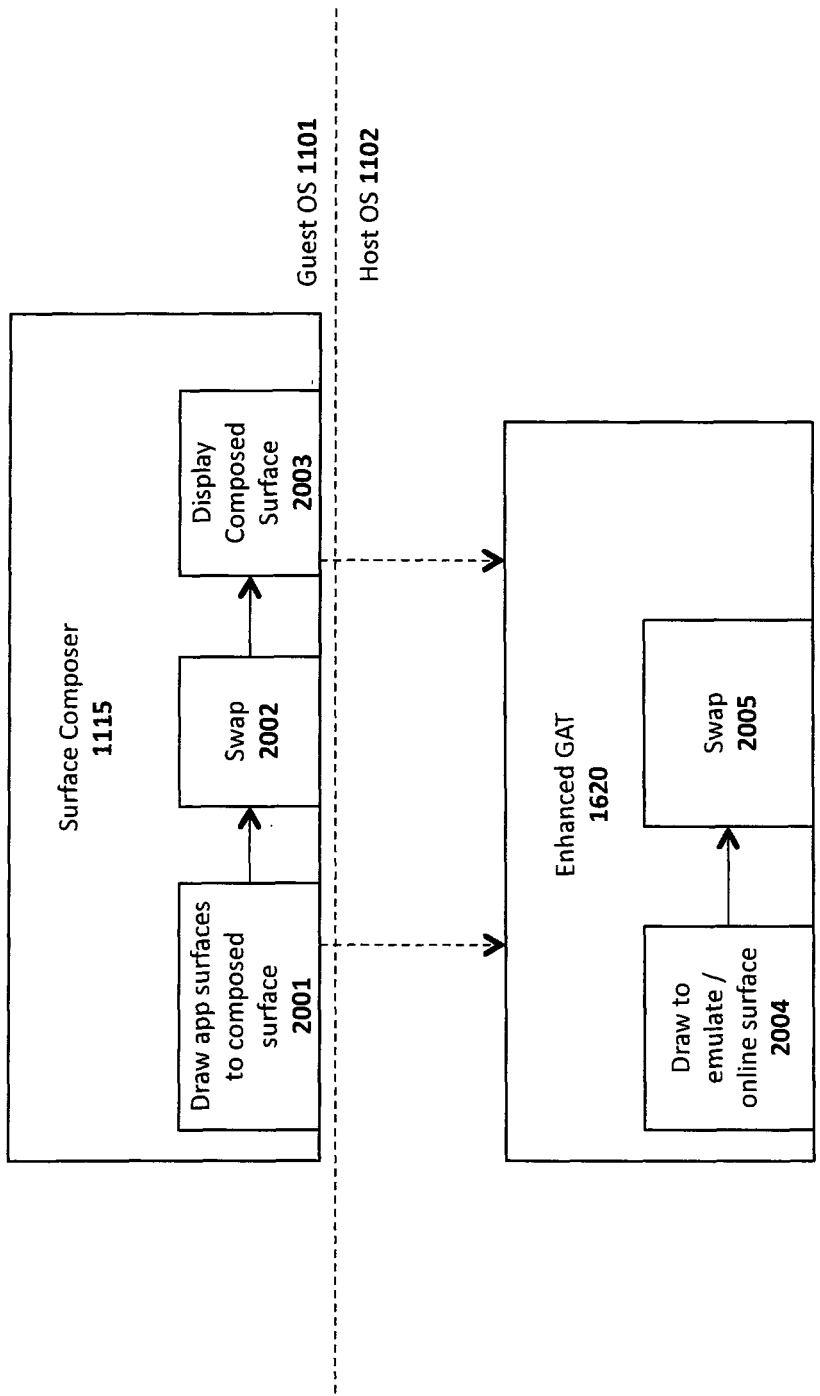
FIG. 20 illustrates one embodiment of the invention in which the surface composer's surface is processed differently than the application's surface.

In contrast, the EGAT 1620 illustrated in FIG. 20 recognizes that the surface created by surface composer 1115 is for direct display (in contrast to surfaces drawn by the applications). It therefore maps the surface composer's surface 2001 to the online surface 2004 directly which can be displayed directly using swap 2005. Thus, when surface composer 1115 invokes its swap API 2002, there is no need to perform the extract operation and when it invokes the display API 2003, there is no need to perform the draw operation (i.e., because the online surface 2004 is displayed directly via swap 2005).

The embodiments of the invention described above provide for differentiation of translation between regular applications and the surface composer, resulting in extraordinary improvement of the user experience for certain graphic applications on a virtualized platform. In contrast, current solutions treat the surface created by these two components in same manner, resulting in additional overhead in the emulation of both the surface composer's surface rendering and the guest application's surface rendering.

One particular example of an embodiment of the invention is implemented according to the following code:

```
If guest apps create surface Si Then
        Create emulate off-screen surface Si₀'
EndIf
If the surface composer creates surface Si Then
        Create emulate online surface Si₀'
End If
If guest apps draw to surface Si Then
        Draw to the emulate off-screen surface Si'
EndIf
If the surface composer draws to surface Si Then
            Perform fix-up operation for input texture in rare cases
            Draw to the emulate online surface Si₀'
EndIf
If guest apps swap surface Si Then
        Extract the pixel buffer associated with Si'
        Perform fix-up operation
If the surface composer swaps surface Si Then
        Do nothing
End If
If the surface composer displays surface Si Then
        Swap the online-surface Si₀' to get it displayed
EndIf
```

3. Surface Translation with Texture Rendering

As mentioned above, to run mobile applications well on a virtual platform, efficient graphics API translation is critical for achieving close to a native user experience. As described above with respect to FIGS. 12 and 16, for example, the guest OS 1101 typically has multiple graphics applications 1105-1106 running simultaneously. Each graphic application 1105-1106 may use a graphics APIs to build a 3D model within a context and render to a surface using the display configuration. When the rendering is complete, the pixel buffer associated with the surface will be swapped to the surface composer 1115 system service, which composes surfaces from multiple applications and then displays the final composed surface.

Logic within the guest OS 1101 (e.g., the graphics API classification module 1616 in FIG. 16) intercepts the graphics AP1 calls and encodes the API calls to a command buffer 1110. The command buffer 1110 is then sent to host OS 1102. A graphics API translator (e.g., the EGAT 1620 in FIG. 16) decodes the command buffer 1110 and translates the guest's graphics AP1 calls to the host OS's native graphics AP1 calls. In this way, the guest's 3D operations are redirected to the host GPU 1110, significantly improving the user experience.

It is very challenging to efficiently emulate the surfaces used in graphics applications. Because the guest OS 11101 has multiple applications 1105-1106 running there may be multiple surfaces being processed. As a traditional GAT translates each guest surface to a host surface, it has to create many surfaces. Each surface reserves many CPU and GPU memory resources and other resources. In addition, the pixel buffer associated with each surface is managed by host window system and not accessible to the GAT as part of the user-level emulator program. The traditional GAT has to copy the pixel buffer out from the surface and compose the texture, which is very time consuming.

The embodiments of the invention discussed below include an important and fundamental graphics API translation mechanism which significantly improves graphics emulation performance. In one embodiment, instead of translating the guest's surface to the host's surface, the enhanced GAT (EGAT) described below translates the guest's surface to a host texture. Rendering to texture is much faster and less resource-demanding than rendering to a surface. It also removes the extra step of copying the pixel buffer out from the surface.

Figure 21:
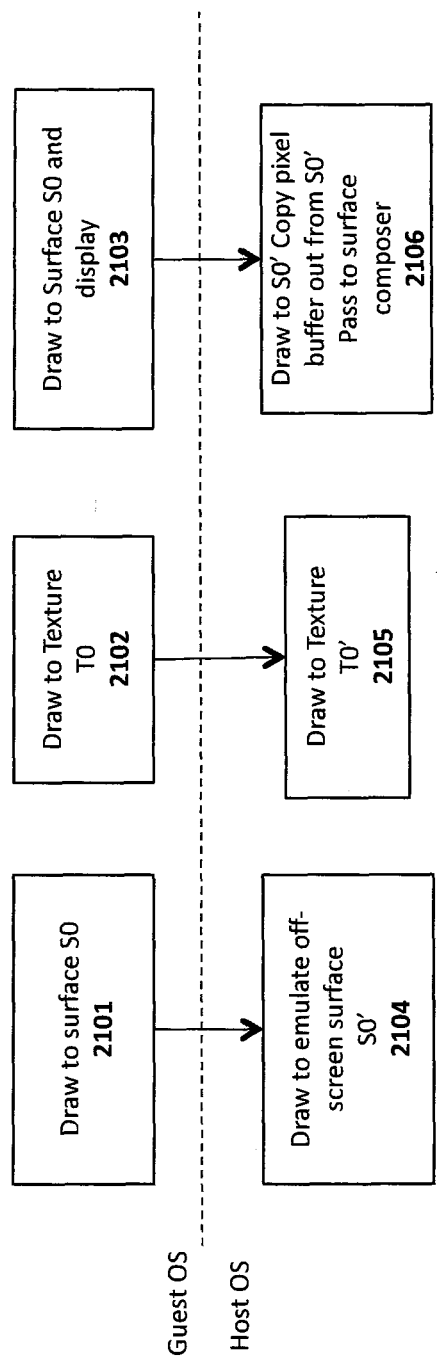
FIG. 21 illustrates a system for emulating surfaces and textures on a host OS.
Figure 22:
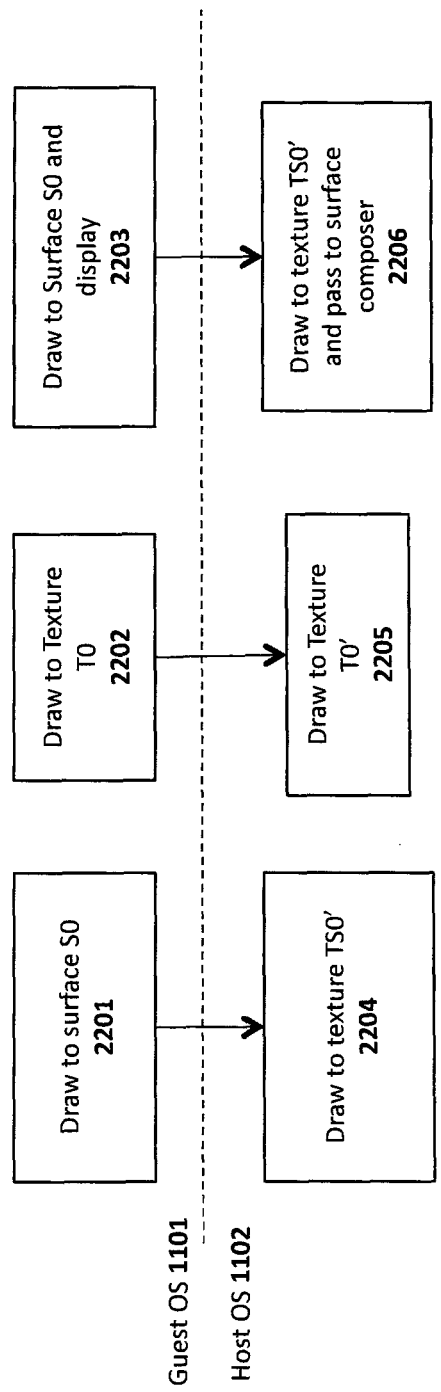
FIG. 22 illustrates one embodiment of the invention which translates a guest's surface to a host texture.

FIG. 21 illustrates existing techniques for emulating surfaces and textures and FIG. 22 illustrates an improved implementation in accordance with one embodiment of the invention.

Turning first to FIG. 21, the guest's surface S0 2101 is translated to heavy-duty off-screen surface S0' 2104, and the guest's texture T0 2102 is translated to light weight texture T0' 2105. To render the resulting surface when the guest application swaps the graphic buffers of S0 for display at 2103, the host GAT draws to S0', copies the pixel buffer out from S0', and asses the results to the surface composer at 2106 (which renders the final surface on the display).

In contrast, in the embodiment of the invention illustrated in FIG. 22, when the guest application creates a surface S0 2201, the EGAT 1620 creates a surface S0' and a corresponding texture TS0' at 2204. The surface S0' reserves minimum resources and is used to assist the emulation. When the guest application binds S0 to a context as the render target, the EGAT 1620 then binds TS0' instead of S0'. When the guest application creates a texture T0 2202, EGAT creates a texture T0' 2205. Finally, when the guest application swaps the graphic buffers of S0 for display at 2203, the EGAT 1620 uses the texture TS0' as input and renders to the emulator's surface, which is then swapped to the host system and displayed in the emulator's application window via surface composer at 2206.

The guest application may also use texture as its render target. After initially binding a surface to its render target and executing drawings, it may then bind a texture to the render target and draw another image. It may further unbind the texture, take the texture as input, and draw it to the original surface. With this technique, a graphics application may render to multiple textures and combine them to create a more impactful 3D effect.

Through monitoring the guest's usage of texture rendering and dynamically adjusting the rendering target, one embodiment of the EGAT 1620 gracefully supports the usage model that guest application can also use rendering to texture feature. When guest application displays the surface, one embodiment of the invention directly pass the texture to the surface composer, skipping the time consuming step of extracting pixel buffer (texture) out from offline surface.

Figure 23:
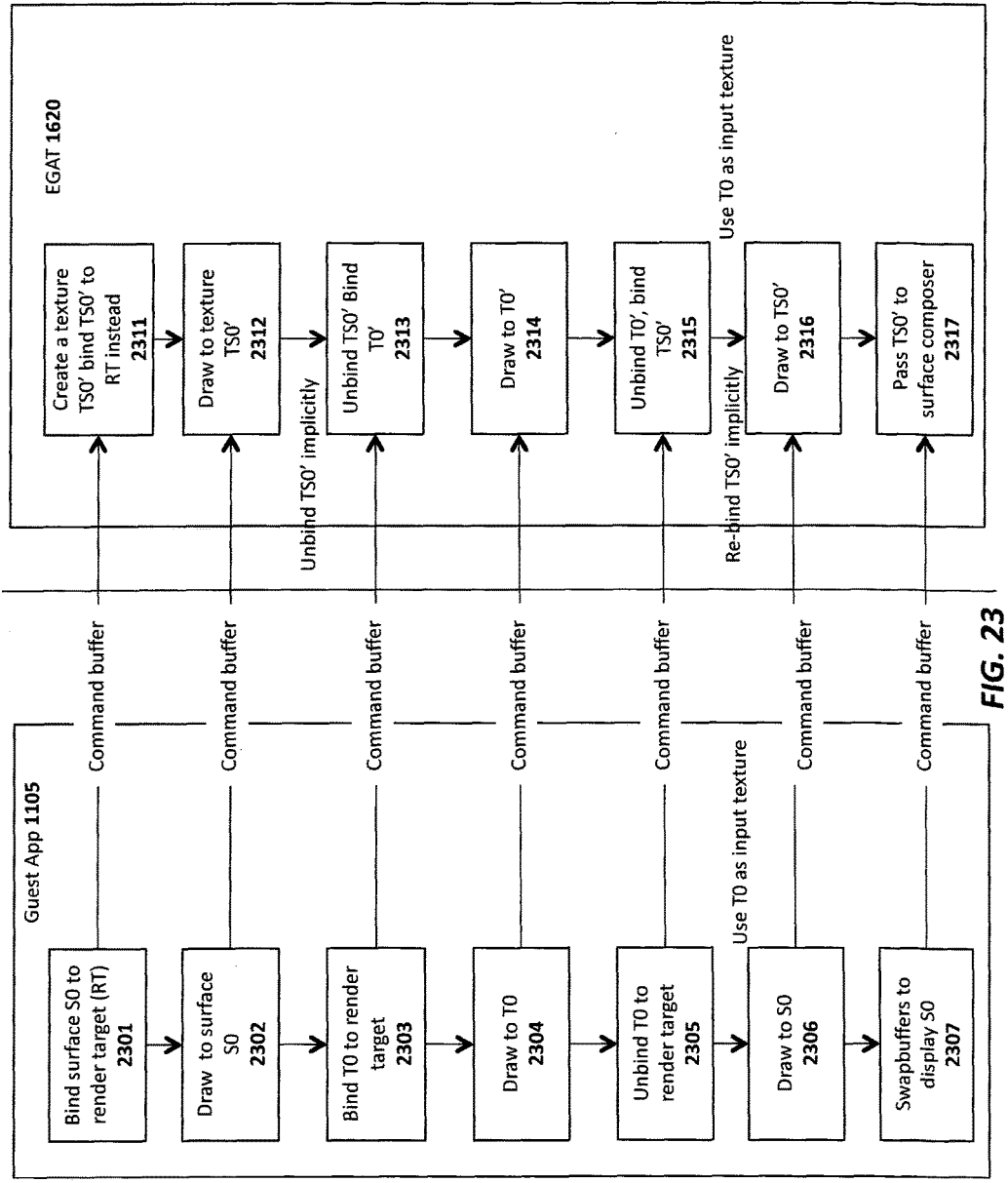
FIG. 23 illustrates additional details employed in one embodiment for translating a guest surface to a host texture.

FIG. 23 illustrates additional details of the operations performed by the guest application 1105 (executed on the host OS 1102) and the EGAT 1620 in accordance with one embodiment of the invention. In one embodiment, when the guest application 1105 creates a surface S0, the EGAT 1620 creates a surface S0' and a corresponding texture TS0'. The surface S0' reserves minimum resources and is used in one embodiment to assist the emulation. When the guest application binds S0 to a context as the render target at 2301, the EGAT 1620 binds TS0' to the render target at 2311 instead of S0'. Thus, when the guest application renders/draws to surface S0 at 2302, the EGAT 1620 draws to the texture TS0' at 2312.

In one embodiment, when the guest application 1105 creates a texture T0, the EGAT 1620 creates a texture T0'. When the guest application binds texture T0 to render the target at 2303, the EGAT unbinds texture TS0' and binds texture T0' to the render target at 2313. When the guest application draws to texture T0 at 2304, the EGAT draws to texture T0' at 2314.

Subsequently, when the guest application 1105 unbinds T0 to render the target, the EGAT 1620 unbinds texture T0' and binds texture TS0' to the render target. Then, when the guest application draws to S0 at 2306, the EGAT 1620 draws to TS0' at 2316. Finally, when the guest application 1105 swaps the graphic buffers of S0 for display at 2307, the EGAT 1620 passes TS0' to the surface composer for rendering and display. In one embodiment, the EGAT 1620 uses texture TS0' as input to render the emulator's surface, which is then swapped to the host system and displayed in the emulator's application window.

The embodiments of the invention described above provide numerous improvements over prior systems. Emulating surfaces is challenging and resource-intensive. The guest may have multiple applications running simultaneously so there may be multiple concurrent surfaces. Mapping the guest application's surface to the host surface is very expensive for a variety of reasons. First, the surface requires significant processing resources as it is associated with multiple graphic buffers (required to swap with the host window system). Moreover, creating multiple surfaces in one emulator application at the host side can consume significant GPU memory. In contrast, rendering to a texture as described herein consumes significantly fewer GPU resources and is much faster than to rendering to a surface. Finally, in a guest OS where multiple application surfaces need to be composed before display, additional steps are required to copy the pixel buffer from the surfaces for composition, which is a time consuming process.

In one embodiment of the invention, the following pseudo-code operations are performed to render to a texture rather than a surface (although it should be noted that the underlying principles of the invention are not limited to this particular implementation):

```
Initialize current render target RT, and its binding as Bind(RT) = NULL;
If app creates surface Si Then
    Creates Si' with minimum resource
    T(Si') = NULL
EndIf
If app creates surface Ti Then
    Creates Ti'
EndIf
If app binds surface Si to RT Then
    If (T(Si') == NULL) Then
        T(Si') = CreateNewTexture(Si');
    EndIf
    Bind T(Si') to RT instead;
    Bind(RT) = T(Si');
EndIf
If app binds texture Ti to RT Then
    Unbind Bind(RT);
    Bind Ti' to RT;
Endif
If app unbinds texture Ti to RT Then
    Unbind Ti' to RT
    Bind Bind(RT) to RT;
Endif
```

Figure 24:
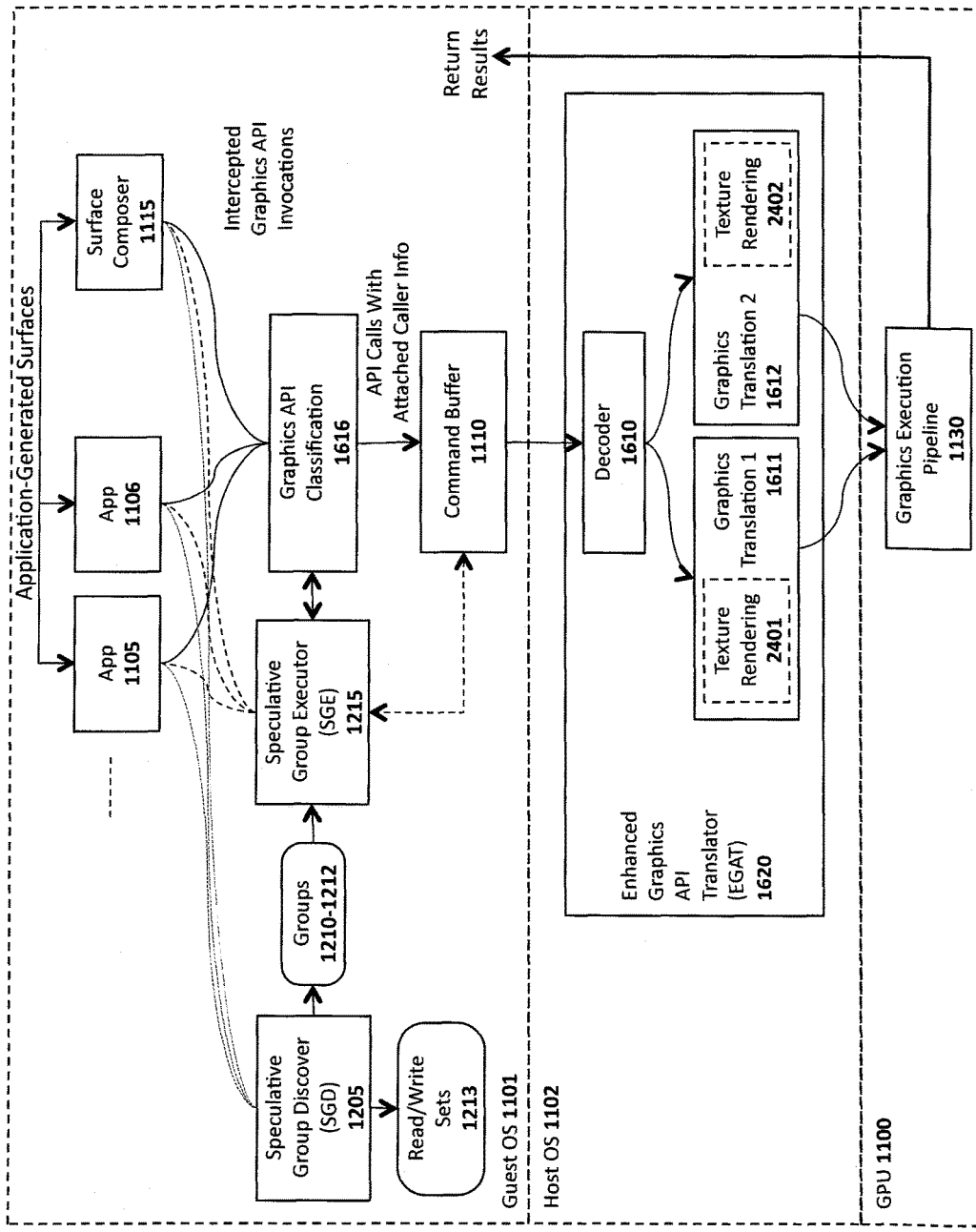
FIG. 24 illustrates one embodiment which includes techniques for speculative group execution, differentiated translation, and texture rendering of surfaces.

As illustrated in FIG. 24, all of the techniques described above for improving the efficiency with which graphics instructions are processed in a virtual execution environment may be combined in a single system to dramatically improve the efficiency of graphics processing. In particular, the combined embodiment shown in FIG. 24 includes a speculative group discover (SGD) module 1205 for compiling groups of API calls 1210-1212 and a speculative group executor (SGE) module 1215 for executing the groups of API calls and caching the results as described above. In addition, this embodiment further improves the graphics performance of emulated graphics applications by differentiating between translations for regular graphics applications and system service applications (e.g., such as the "surface composer" discussed above). In particular, a first translator 1611 of the EGAT 1620 may translate graphics API calls originating from applications 1105-1106 and a second translator 1612 may translate the graphics API calls originating from system component, such as the surface composer 1115. In addition, this embodiment includes texture rendering logic 2401 and 2402, utilized by the translators 1611 and 1612, respectively, to translate a guest's surface to a host texture. As discussed above, translating to texture as described in the present application is faster and less resource-intensive than translating the guest's surface to a host's surface (as is done in existing graphics translation systems). Combining all of these embodiments into a single embodiment as shown in FIG. 24 dramatically improves the efficiency of graphics processing in a virtual execution environment.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
   a processor and a non-transitory machine-readable storage medium that contain instructions that cause the system to:
   detect graphics application programming interface (API) calls in a guest execution environment and responsively classify the graphics API calls as originating from an application of a system component,
   associate information with each of the graphics API calls to indicate whether each of the graphics API calls originated from the application or from the system component,
   translate the graphics API calls to a format executable in a host execution environment, and
   identify each of the API calls as originating from the application or the system component using the information associated with the graphics API calls by the system, wherein a first translation sequence is to translate the graphics API calls to a first set of translated graphics API calls if the graphics API calls originated from the application, and wherein a second translation sequence is to translate the graphics API calls to a second set of translated graphics API calls if the graphics API calls originated from the system component, the first set of translated graphics API calls being different from the second set of translated graphics API calls.

2. The system as in claim 1 wherein the first and second sets of translated graphics API calls comprise native graphics API calls directly executable in the host execution environment.

3. The system as in claim 1 further comprising:
   a command buffer to store the graphics API calls prior to translation by the first translation sequence or the second translation sequence, wherein the system is to attach the information indicating that the API calls originated from the application or the system component to the graphics API calls in the command buffer.

4. The system as in claim 1 wherein the system is further to analyze the calling environment including the calling stack or process name to determine whether the graphic API call has originated from the application or from the system component.

5. The system as in claim 1 wherein the system is further to render a final composed surface using composed surfaces from the multiple applications.

6. The system as in claim 5 wherein a surface composer composes the surfaces.

7. The system as in claim 1 wherein the guest execution environment comprises a guest operating system and the host execution environment comprises a host operating system exposing an application programming interface (API) to support execution of the guest operating system.

8. The system as in claim 1 wherein the system is further to:
   translate a guest surface embodied in the graphics API calls to a host texture embodied in the first and second sets of translated graphics API calls.

9. A system comprising:
   a processor and a non-transitory machine-readable storage medium that contain instructions that cause the system to:
   determine a first group of graphics application programming interface (API) calls which may be speculatively executed together,
   responsively execute all of the graphics API calls in the first group to generate a first group of results in response to detecting a first one of the graphics API calls in the first group being invoked,
   cache the first group of results in memory,
   provide a result from the cached group of results in response to a second one of the graphics API calls in the first group being invoked,
   store the graphics API calls using a command buffer, and
   determine whether the graphics API calls originated from an application or a system component, wherein a first translation sequence is to translate the graphics API calls to a first set of translated graphics API calls if the graphics API calls originated from the application; and wherein a second translation sequence is to translate the graphics API calls to a second set of translated graphics API calls if the graphics API calls originated from the system component, the first set of translated graphics API calls being different from the second set of translated graphics API calls.

10. The system as in claim 9, wherein the system is further to:
    attach information to the graphics API calls indicating whether the API calls originated from the application or the system component, the system to store the graphics API calls and the attached information in the command buffer.

11. The system as in claim 9 wherein the determination of the first group of API calls and the execution of the first group of API calls are to be performed within a guest execution environment and wherein the determination of whether the graphics API calls originated from an application or a system component is to be performed within a host execution environment.

12. The system as in claim 11 wherein the host execution environment is to expose a virtual machine on which the guest execution environment is to be executed.

13. The system as in claim 12 wherein the virtual machine comprises an application programming interface (API) exposed by the host execution environment.

14. The system as in claim 11 wherein the system is further to:
 translate a guest surface embodied in the graphics API calls to a host texture embodied in the first and second sets of translated graphics API calls.

15. The system as in claim 9 wherein the first translation sequence is to translate the graphics API calls using a first set of translation techniques and the second translation sequence is to translate the graphics API calls using a second set of translation techniques different from the first set of translation techniques.

16. A system comprising:
 a processor and a non-transitory machine-readable storage medium that contain instructions that cause the system to:
  determine a first group of graphics application programming interface (API) calls which may be speculatively executed together;
  responsively execute all of the graphics API calls in the first group to generate a first group of results in response to detecting a first one of the graphics API calls in the first group being invoked,
  cache the first group of results in memory;
  to provide a result from the cached group of results in response to a second one of the graphics API calls in the first group being invoked;
  store the graphics API calls using a command buffer,
  translate the graphics API calls to a set of translated graphics API calls, wherein at least some of the graphics API calls are to be used to build a 3-dimensional (3D) model and render to a surface; and
  translate the surface rendered by the graphics API calls to a first texture embodied in the translated graphics API calls.

17. The system as in claim 16 wherein when the graphics API calls are directed to rendering the surface on a display, the system is to use the texture to render to the display.

* * * * *